US008919791B2

(12) United States Patent
Foster

(10) Patent No.: US 8,919,791 B2
(45) Date of Patent: Dec. 30, 2014

(54) WHEELED CONTAINER WITH REPOSITIONABLE AXLE

(71) Applicant: Rehrig Pacific Company, Los Angeles, CA (US)

(72) Inventor: Derick Foster, Huntington Beach, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 37 days.

(21) Appl. No.: 13/677,366

(22) Filed: Nov. 15, 2012

(65) Prior Publication Data

US 2013/0119625 A1    May 16, 2013

Related U.S. Application Data

(60) Provisional application No. 61/559,895, filed on Nov. 15, 2011.

(51) Int. Cl.
*B62D 21/14*    (2006.01)
*B62B 1/00*    (2006.01)
*B65F 1/14*    (2006.01)

(52) U.S. Cl.
CPC ... *B62B 1/00* (2013.01); *B65F 1/14* (2013.01); *B65F 1/1473* (2013.01); *B65F 2220/12* (2013.01)
USPC .......................... 280/43; 280/47.26; 280/79.2

(58) Field of Classification Search
CPC ............ B62B 3/14; B62B 3/16; B62B 3/006; B62B 5/04

USPC ................. 280/33.998, 37, 43.1, 47.26, 79.2, 280/47.34, 645, 43

See application file for complete search history.

(56) References Cited

U.S. PATENT DOCUMENTS

| | | | | |
|---|---|---|---|---|
| 2,472,491 | A * | 6/1949 | Quinton | 280/37 |
| 4,254,850 | A * | 3/1981 | Knowles | 280/645 |
| 4,575,109 | A * | 3/1986 | Cowdery | 280/37 |
| 5,465,844 | A | 11/1995 | Lee | |
| 5,599,037 | A * | 2/1997 | Spickler | 280/47.26 |
| 5,743,542 | A | 4/1998 | Mast et al. | |
| 6,145,856 | A * | 11/2000 | Conti | 280/47.26 |
| 6,360,400 | B1 * | 3/2002 | Chang | 280/37 |
| 6,460,867 | B2 * | 10/2002 | Sciulli | 280/47.26 |
| 6,814,361 | B2 * | 11/2004 | Tsu | 280/43.1 |

(Continued)

FOREIGN PATENT DOCUMENTS

EP    0 679 591 A1    11/1995
GB    2 309 672 A    8/1997

(Continued)

OTHER PUBLICATIONS

European Search Report for EP Application No. 12192858.4, May 29, 2013.

*Primary Examiner* — Hau Phan
(74) *Attorney, Agent, or Firm* — Carlson, Gaskey & Olds

(57) ABSTRACT

A container includes a body having base wall and a side wall extending upward from the base wall. The body includes a bracket portion having an elongated slot. An axle extends through the elongated slot. The axle is slidable in the elongated slot between a deployed position and a retracted position. A wheel is connected proximate one end of the axle. A clip secures the axle within the elongated slot.

19 Claims, 29 Drawing Sheets

(56) References Cited

U.S. PATENT DOCUMENTS

| | | | |
|---|---|---|---|
| 7,503,439 B2 * | 3/2009 | O'Shea et al. | 280/37 |
| 7,712,752 B2 * | 5/2010 | Horning | 280/47.19 |
| 7,997,591 B2 * | 8/2011 | Arthur | 280/37 |
| 2004/0108666 A1 | 6/2004 | Lauer | |

FOREIGN PATENT DOCUMENTS

| | | |
|---|---|---|
| WO | 98 49073 | 11/1998 |
| WO | 98 49074 A1 | 11/1998 |
| WO | 2004 013021 A1 | 2/2004 |

* cited by examiner

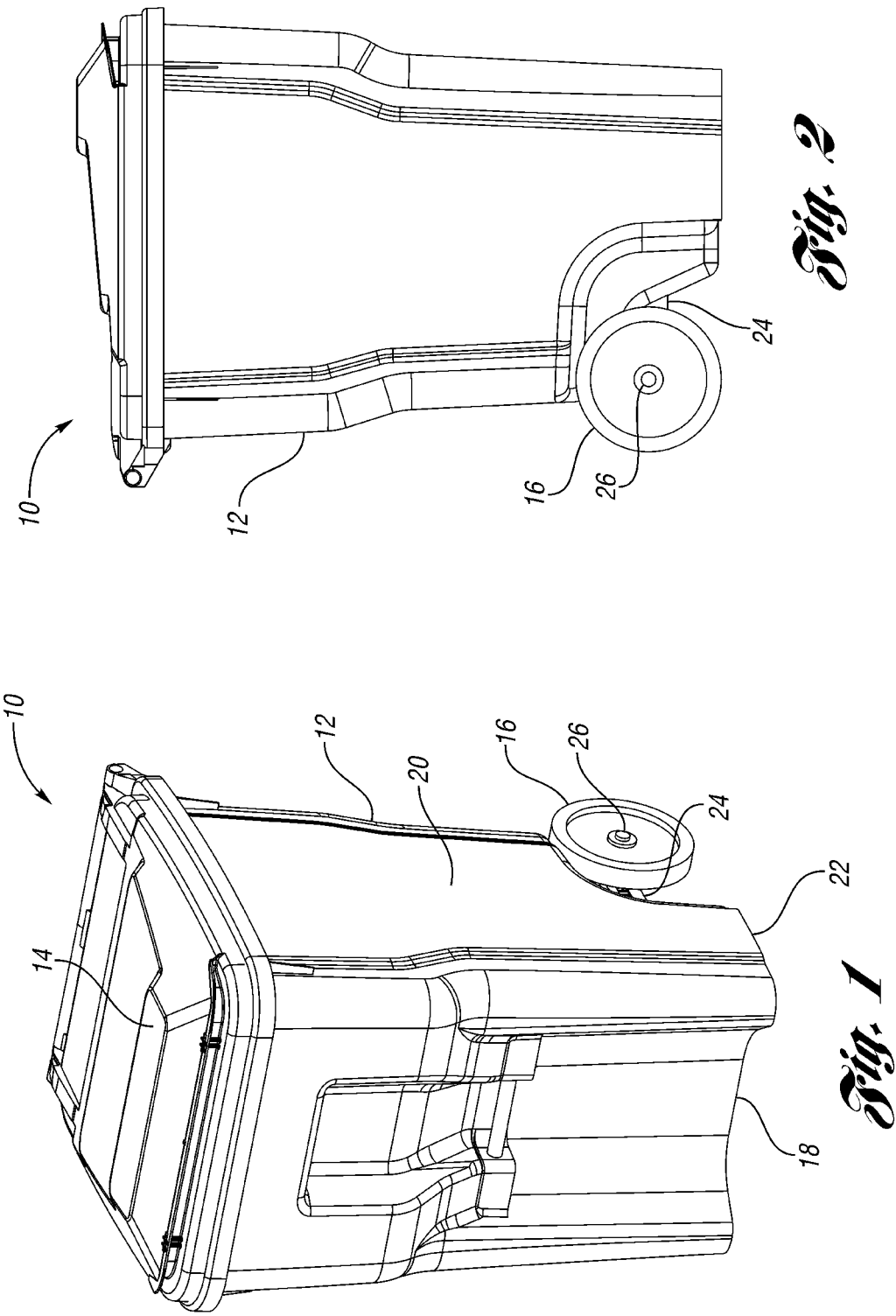

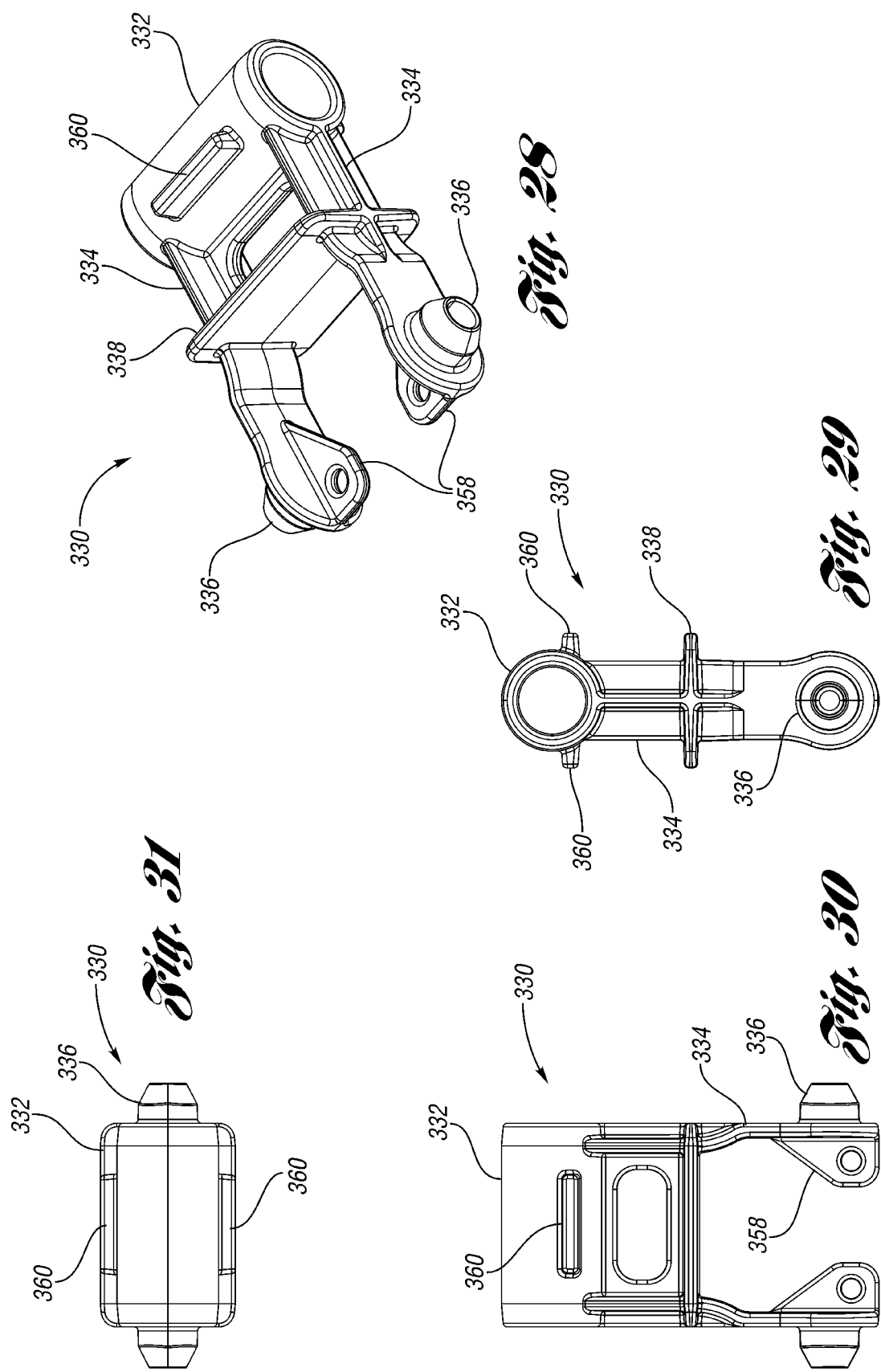

WHEELED CONTAINER WITH REPOSITIONABLE AXLE

BACKGROUND

Roll-out carts for waste collection or recycling are well-known. The roll-out carts generally include a container body having wheels attached to a lower, rear portion of the body by an axle. Generally, the body is tapered, such that identical bodies can be nested within one another for storage and shipping. To accomplish nesting, sometimes the wheels are positioned far enough forward of the container so that the wheeled body can still be nested in an identical body. However, moving the wheels forward reduces the stability of the roll-out cart during use by the ultimate user.

The cart is more stable if the axle of the wheels can be positioned more toward the rear of the cart, such that the wheels protrude rearward outside the envelope or footprint of the body. However, in this position, the wheeled body cannot be nested in an identical body.

As a result, the roll-out carts may be shipped with the axles and wheels disassembled from the body. However, this requires subsequent assembly of the axles and wheels, which could be lost during transit.

SUMMARY

The present invention provides a container, such as a roll-out waste cart. The container includes a body having base wall and a side wall extending upward from the base wall. The body includes a bracket portion having an elongated slot. An axle extends through the elongated slot. The axle is slidable in the elongated slot between a deployed position and a retracted position. A wheel is connected proximate one end of the axle. A clip secures the axle within the elongated slot.

BRIEF DESCRIPTION OF THE DRAWINGS

FIG. 1 is a perspective view of a container according to one embodiment.
FIG. 2 is a side view of the container of FIG. 1.
FIG. 28 is a perspective view of the spacer lock of FIG. 24.
FIG. 29 is a side view of the spacer lock of FIG. 28.
FIG. 30 is a top view of the spacer lock of FIG. 28.
FIG. 31 is an end view of the spacer lock of FIG. 28.

DESCRIPTION OF A PREFERRED EMBODIMENT

Figure 3:
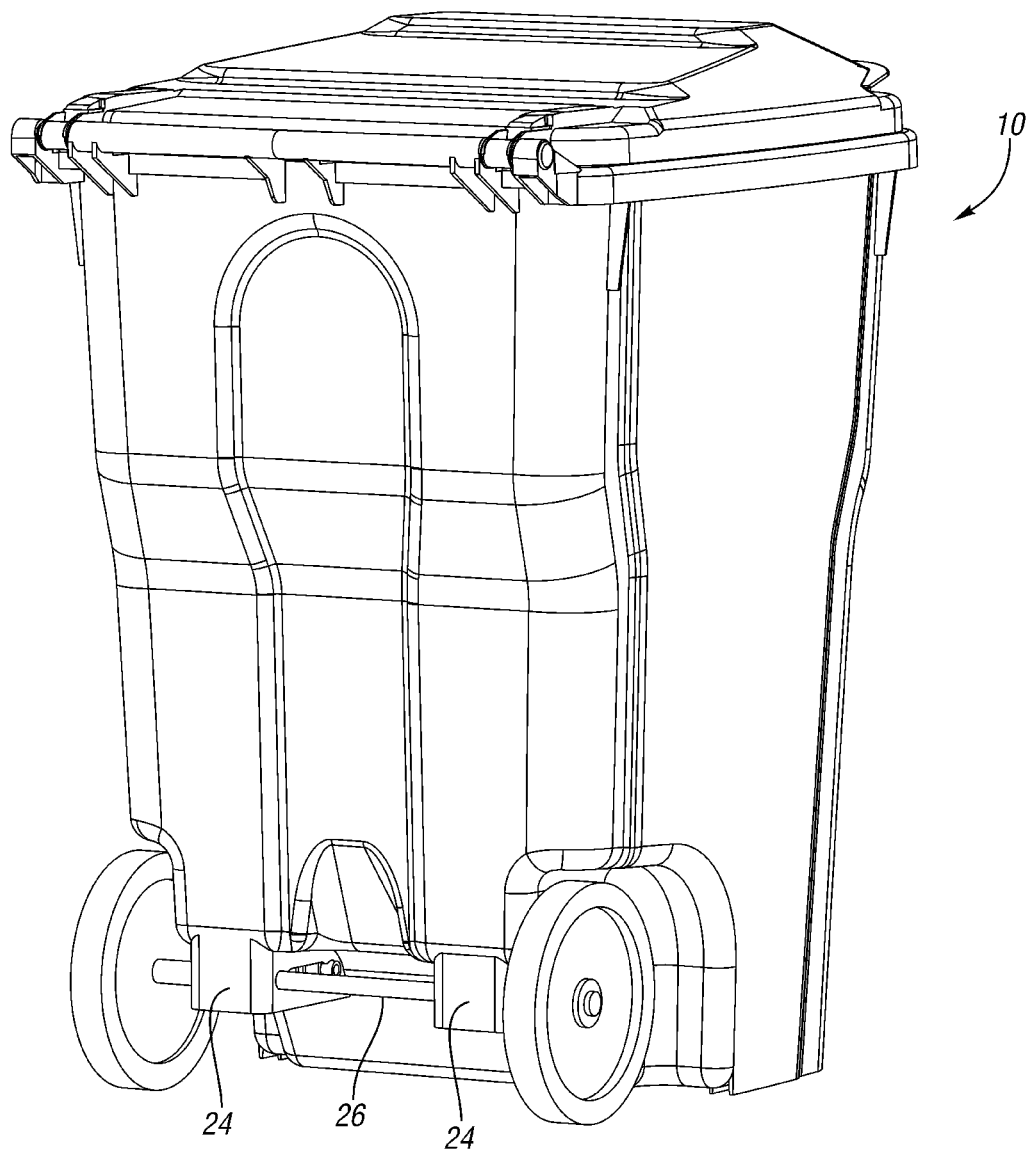
FIG. 3 is rear perspective view of the container of FIG. 1.

A container 10 according to one embodiment of the present invention is shown in FIGS. 1 and 2. The container 10 includes a body 12 and a lid 14. The container 10 further includes a pair of wheels 16 at a lower end of the body 12. The body 12 includes a base wall 18 and a sidewall 20 extending upward from a periphery of the base wall 18. The body 12 includes a forward portion 22 which rests on a ground or floor and one or more bracket portion 24 to which the wheels 16 are secured by an axle 26. The body 12 may be injection molded as a single piece of plastic.

Referring to FIG. 3, which is a rear view of the container 10, the axle 26 is secured to a pair of the bracket portions 24.

Figure 5:
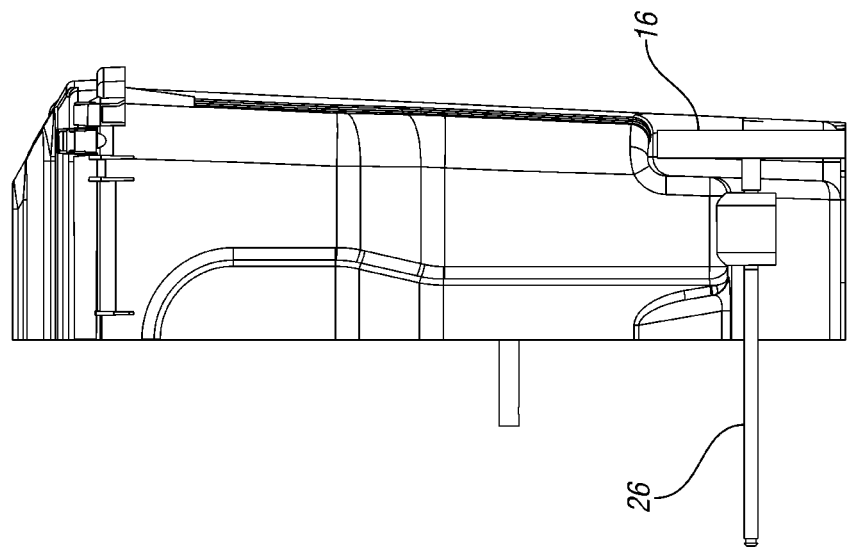
FIG. 5 is a rear view of the sectioned container of FIG. 4.
Figure 4:
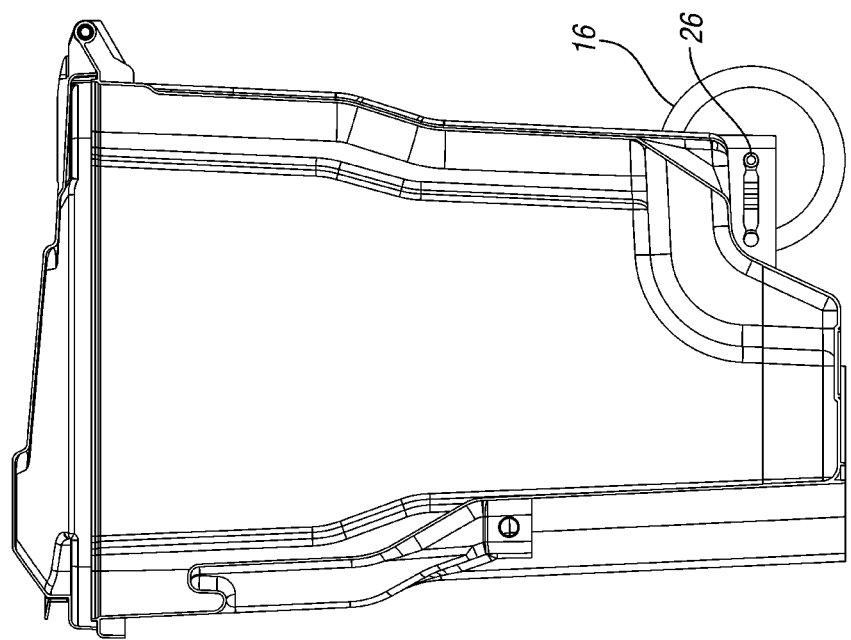
FIG. 4 is a side section view of the container of FIG. 1 with the wheel in the deployed position.
Figure 7:
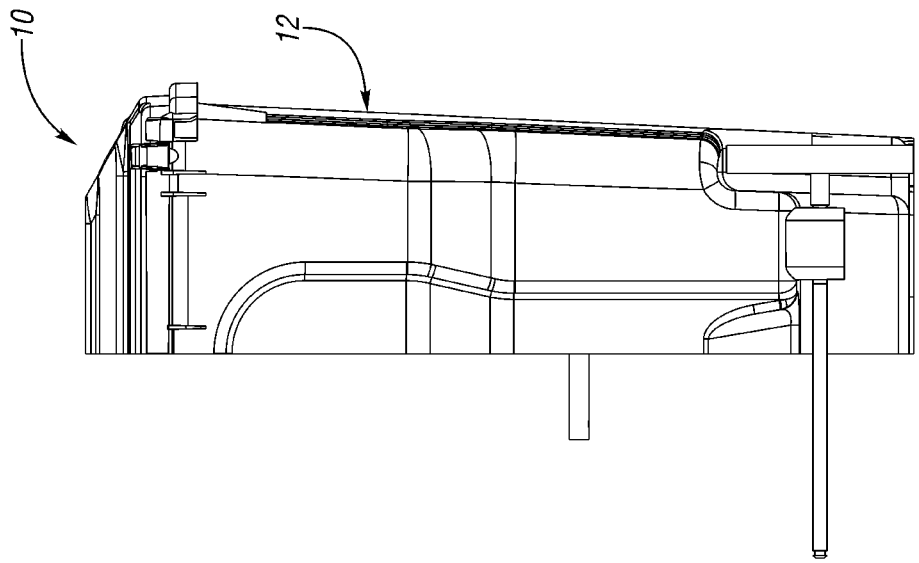
FIG. 7 is a rear view of the sectioned container of FIG. 6.
Figure 6:
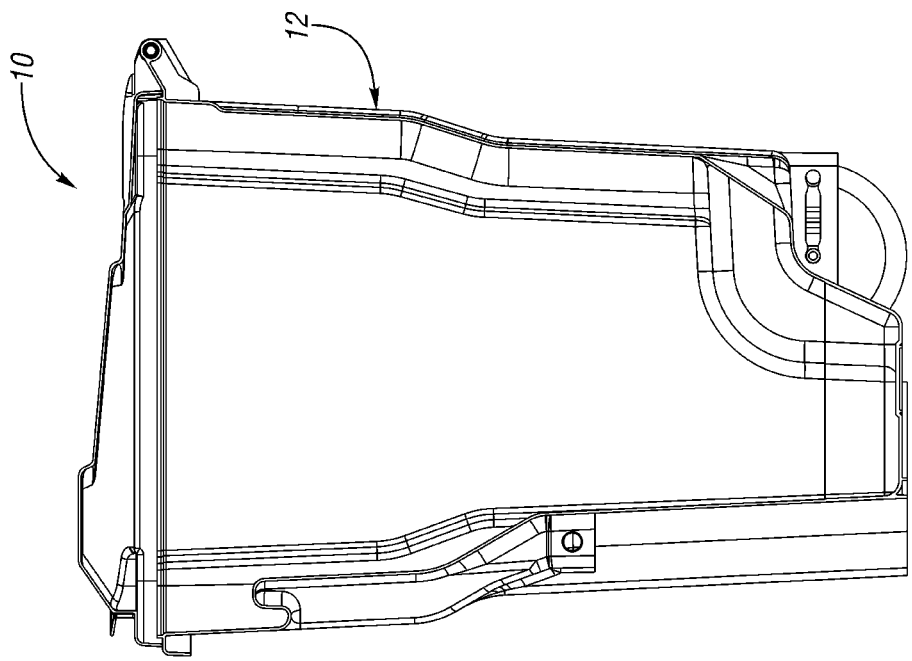
FIG. 6 is a side section view of the container of FIG. 1 with the wheel in the retracted position.

FIGS. 4 and 5 are section views through the container 10. The axle 26 and wheel 16 are shown in the deployed, use position in which the wheels 16 protrude rearwardly of a rear wall of the body 12 and the axle 26 is positioned close to a plane containing the rear wall of the body 12. The axle 26 is slidable between the deployed, use position of FIGS. 4 and 5 and the retracted, shipping position shown in FIGS. 6 and 7. In FIGS. 6 and 7, the axle 26 and wheels 16 are slid inward of the container 10, i.e. to a position within the footprint of the container 10. In other words, the wheels 16 do not protrude rearward of the rear wall of the body 12 and the axle 26 is spaced away from the plane containing the rear wall of the body 12.

Figure 8:
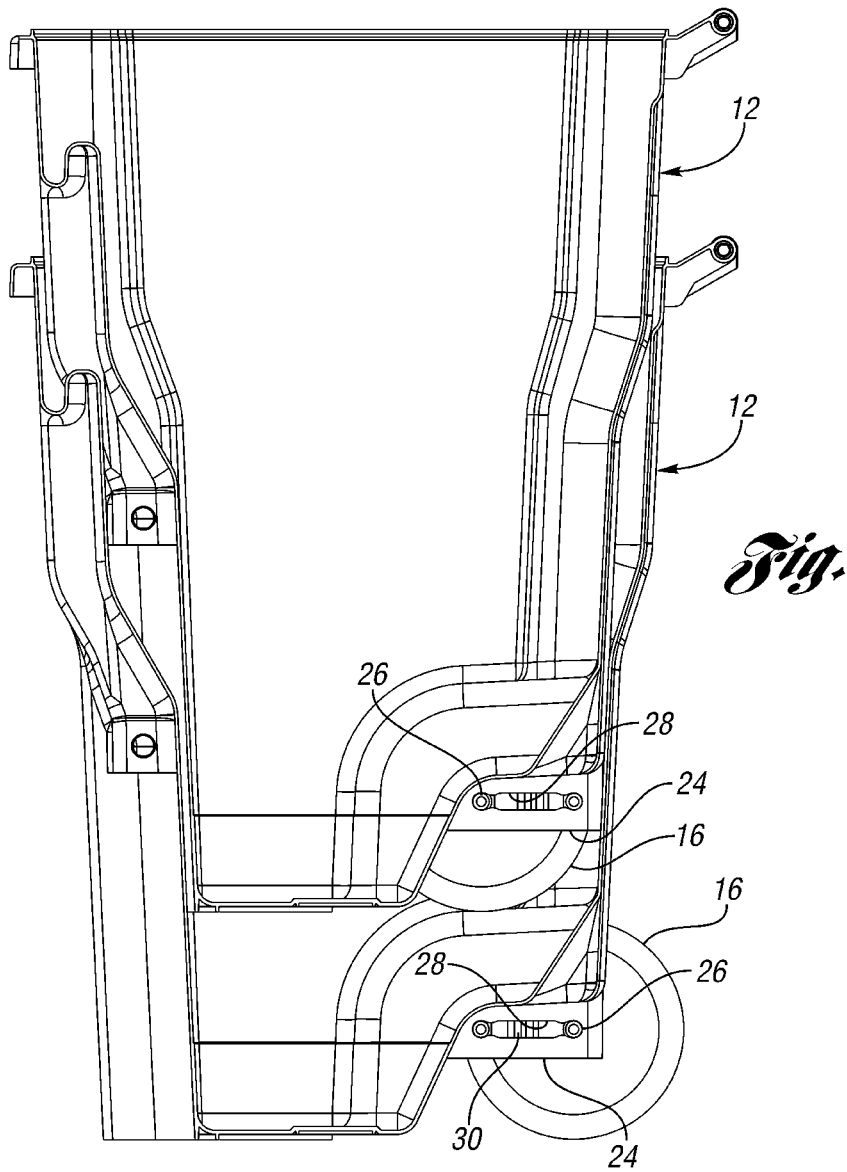
FIG. 8 is a section view of the container of FIG. 4 with an identical container nested therein, with the wheel in the retracted position.

In FIG. 8, an upper container body 12 has its axle 26 in the retracted, storage position, such that the body 12, axle 26 and wheels 16 can be nested within an identical lower body 12. In FIG. 8, the lower body 12 has its axle 26 and wheels 16 in the deployed, use position, where it would not be able to nest within an identical body 12. However, the upper body 12, with the axle 26 and wheels 16 in the retracted position, can be nested within the lower body 12. This greatly reduces the amount of space required to ship the bodies 12, or, alternatively eliminates the need to remove (and subsequently reassemble) the wheels 16 and axle 26 to ship the bodies 12. As can also be seen in FIG. 8, the axle 26 is slidable in a slot 28 in each bracket portion 24. The axle 26 is positioned within the slot 28 by a clip or spacer lock 30.

Figure 9:
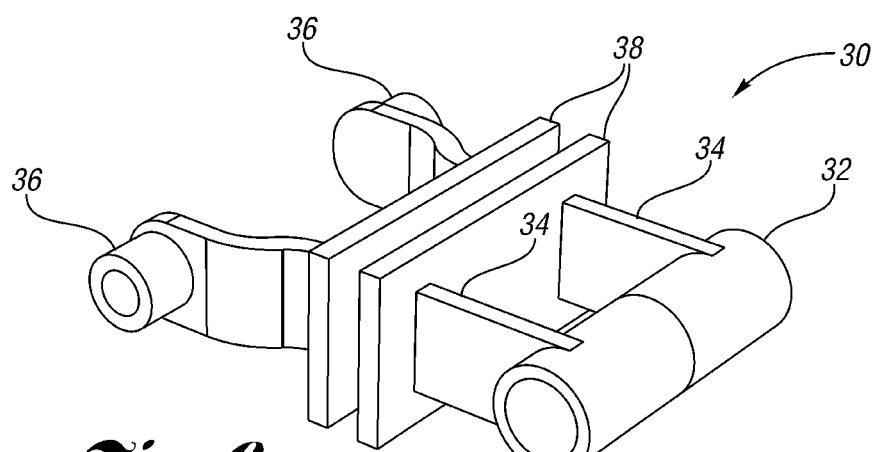
FIG. 9 is a perspective view of the spacer lock.

FIG. 9 is a perspective view of the spacer lock 30. The spacer lock 30 includes an axle-retaining portion 32 having a cylindrical passageway therethrough. A pair of arms 34 extend from the axle-retaining portion 32. Locking pins 36 extend outwardly from ends of the arms 34. A pair of locking ribs or plates 38 connect mid-portions of the arms 34 and define a space therebetween. The spacer lock 30 can be molded plastic or metal.

Figure 10:
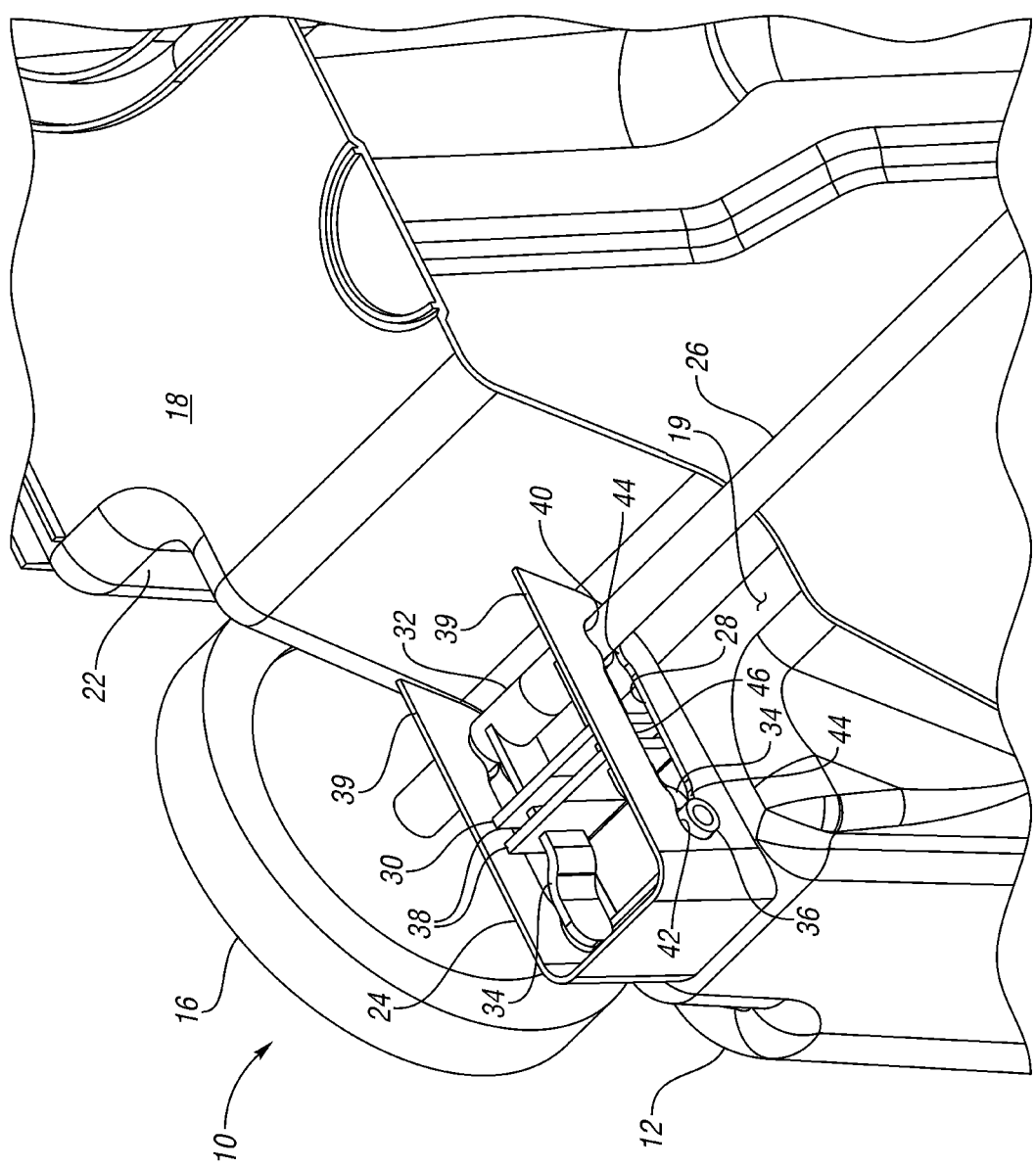
FIG. 10 is a bottom perspective view of one half of the container.

FIG. 10 is a bottom perspective view of one half of the container 10. As shown, the base wall 18 includes an upper wall portion 19 toward the rear of the container 10. The bracket portions 24 extend downward from the upper wall portion 19. Each bracket portion 24 includes a pair of spaced apart walls 39, each having the elongated slot 28 formed therein. Each slot 28 includes a forward portion 40 and a rearward portion 42. Reduced width portions 44 are adjacent the forward portion 40 and rearward portion 42. Each slot 28 includes a larger width mid-portion 46 between the reduced width portions 44. In FIG. 10, the axle 26 is shown in the forward, storage position, in the forward portion 40 of the slots 28. The locking pins 36 of the spacer lock 30 are received in the rearward portions 42 of the slots 28. The axle 26 extends through the axle-retaining portion 32 of the spacer lock 30.

Figure 11:
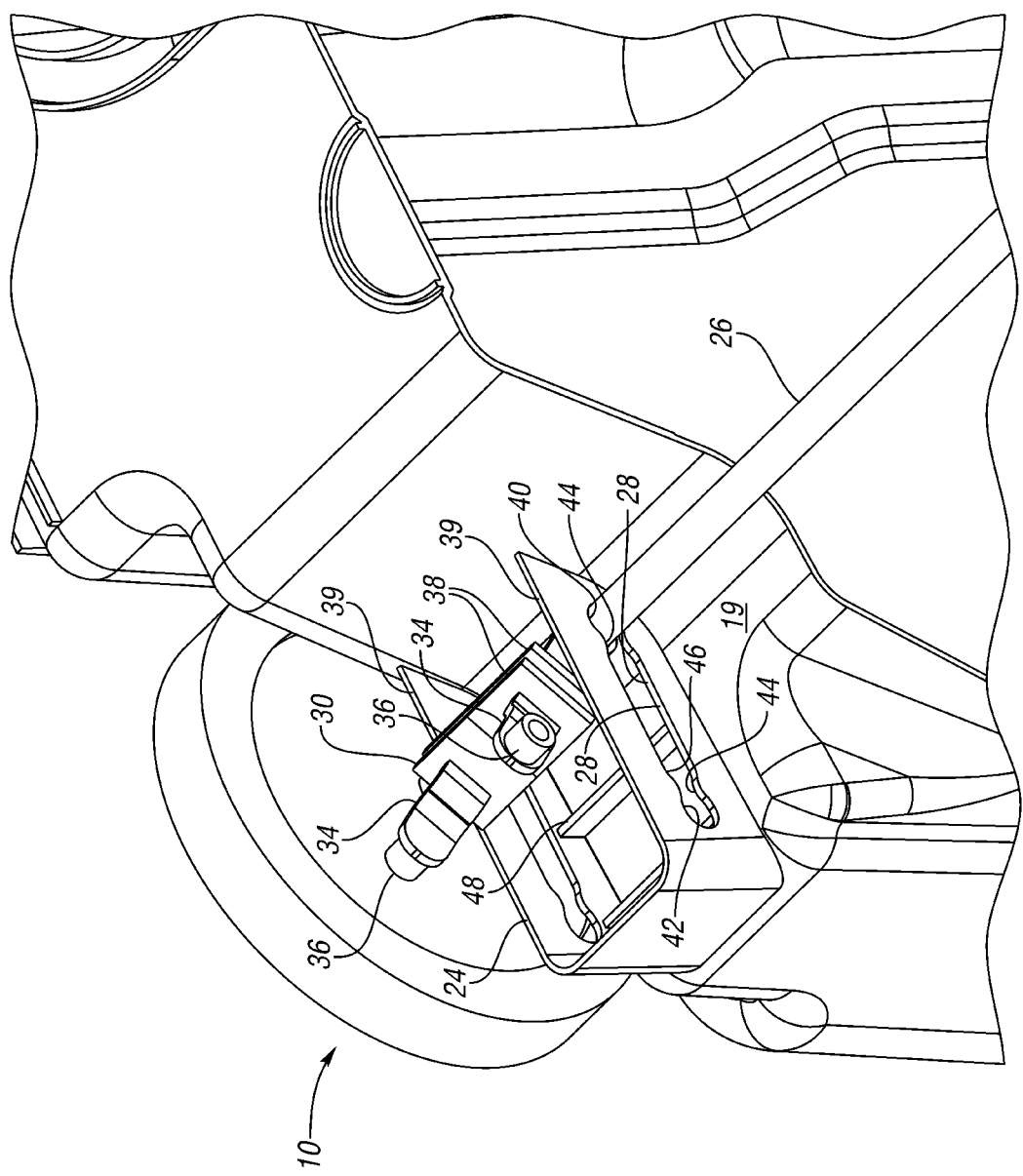
FIGS. 11-14 illustrate sequential steps in moving the axle from the storage position to the use position.

FIGS. 11-14 illustrate how the axle 26 can be moved from the storage position to the use position. First, referring to FIG. 11, the locking pins 36 are depressed toward one another, thereby flexing the arms 34 until the locking pins 36 can be removed from the rearward portions 42 of the slots 28. The arms 34 of the spacer lock 30 can then be lifted to the position shown in FIG. 11. As can be seen in FIG. 11, an alignment rib 48 extends from the upper wall portion 19 between the walls 39 of the bracket portion 24.

Figure 12:
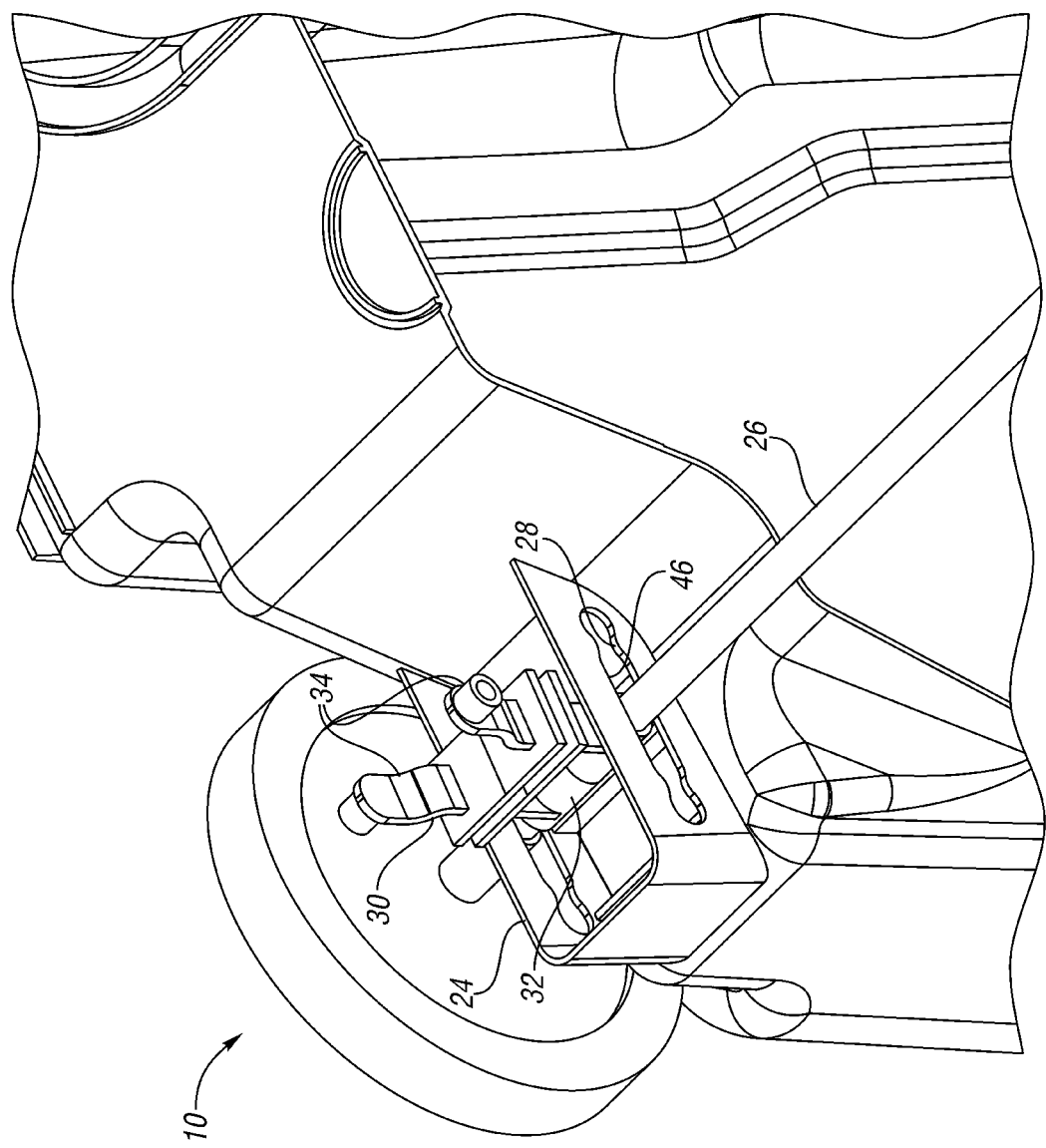

As shown in FIG. 12, the axle 26, as well as the axle-retaining portion 32 of the spacer lock 30 is then slid to the mid-portion 46 of the slots 28. The arms 34 are rotated about the axis of the axle-retaining portion 32 and the axle 26.

Figure 13:
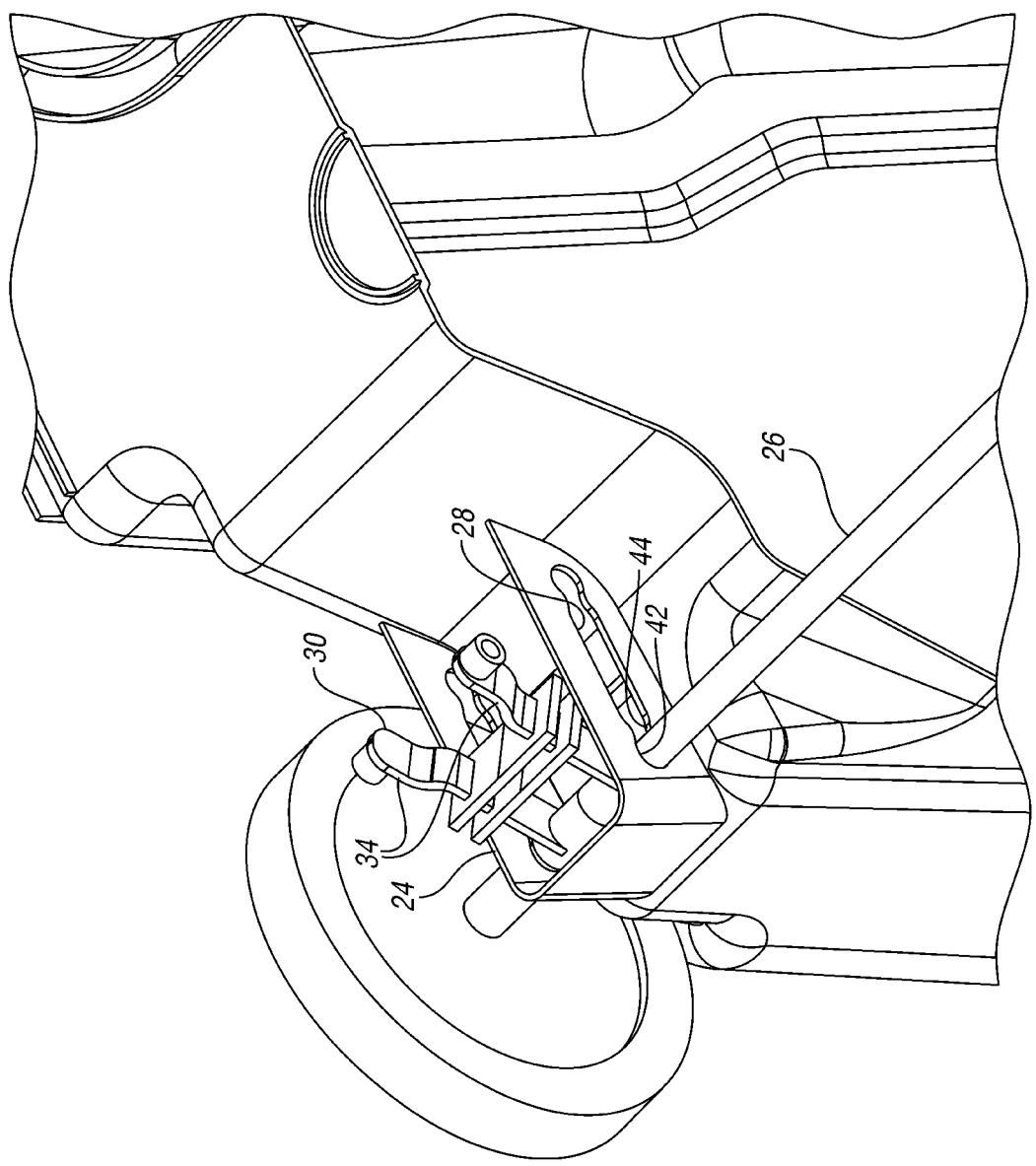
Figure 14:
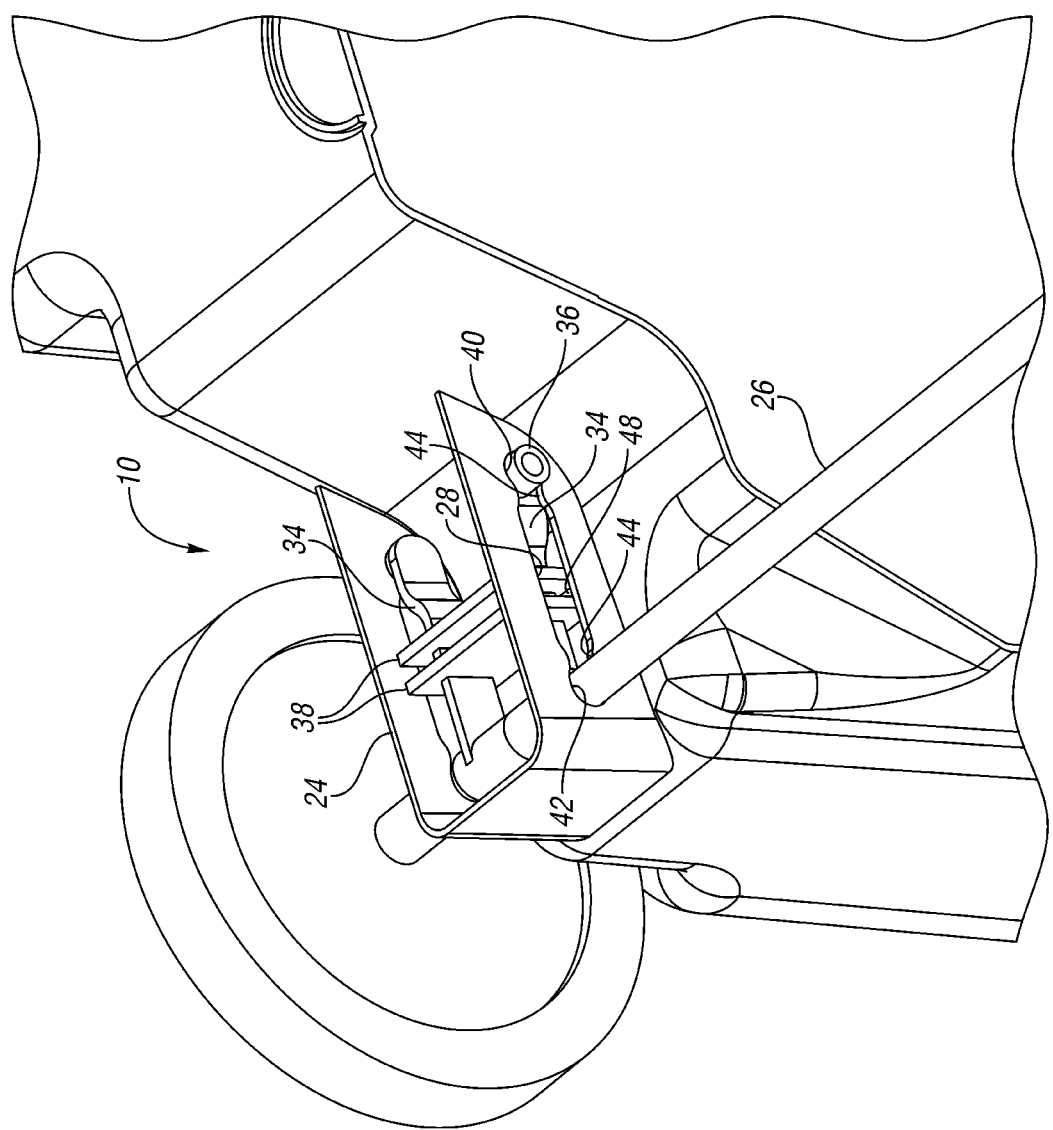

As shown in FIG. 13, the axle 26 is then slid to the rearward portion 42 of the slot 28. The arms 34 of the spacer lock 30 are pivoted downward to the position shown in FIG. 14. In FIG. 14, the locking pins 36 are received in the forward portions 40 of the slots 28. This locks the axle 26 in the rearward portion 42 of the slot 28, in the deployed, use position. The alignment rib 48 is captured between the locking plates 38, which keeps the axle 26 in the rearward portion 42 of the slot 28. Most of the forces on the axle 26 toward the front of the container 10 will bear on the alignment rib 48, not the locking pins 36. The alignment rib 48 is also captured between the locking plates 38 when the axle is in the storage position (FIG. 10).

Figure 15:
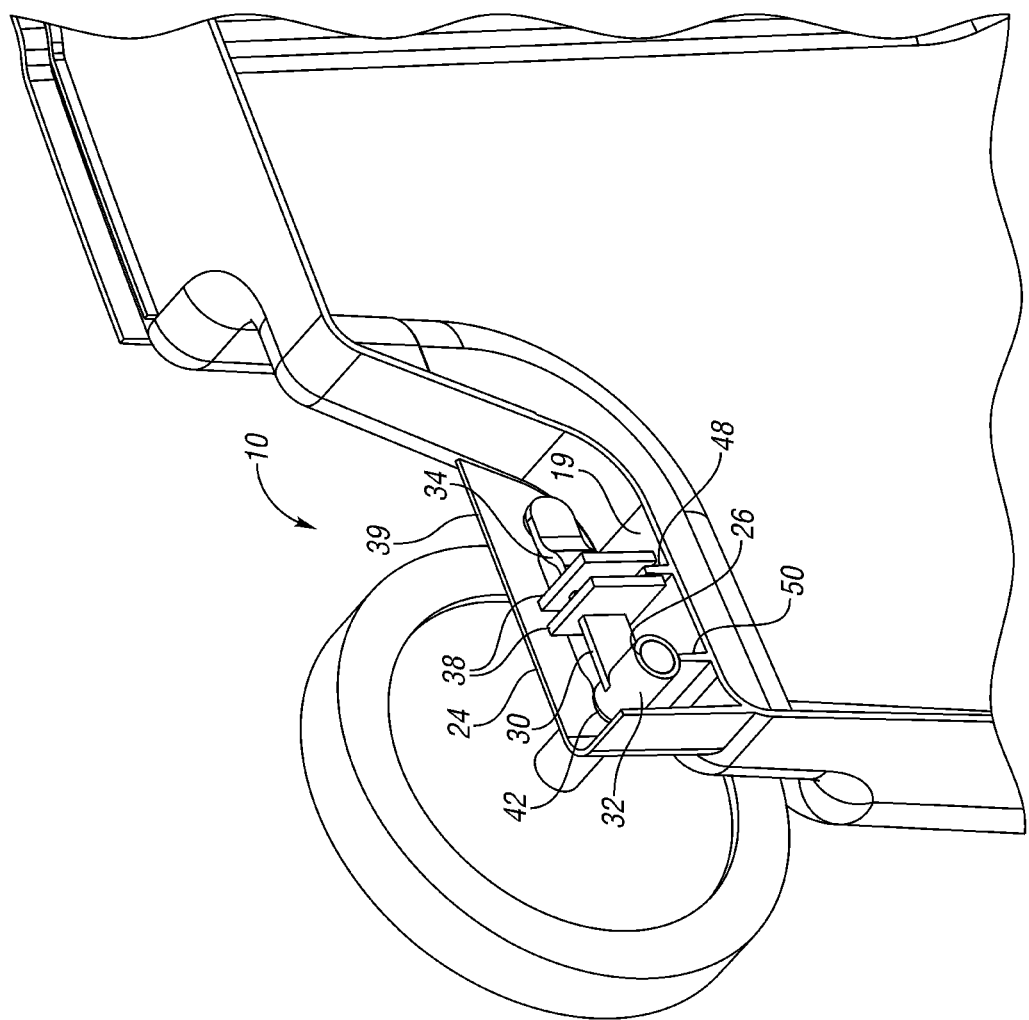
FIG. 15 is a section view through the container of FIG. 14.

FIG. 15 is a section view through the container 10 of FIG. 14. As shown, the alignment rib 48 is between the locking plates 38 of the spacer lock 30. A support rib 50, also extending from the upper wall portion 19 is aligned with the axle-retaining portion 32 of the spacer lock in the use position to transfer upward forces on the axle 26 to the upper wall portion 19 of the container 10.

Figure 16:
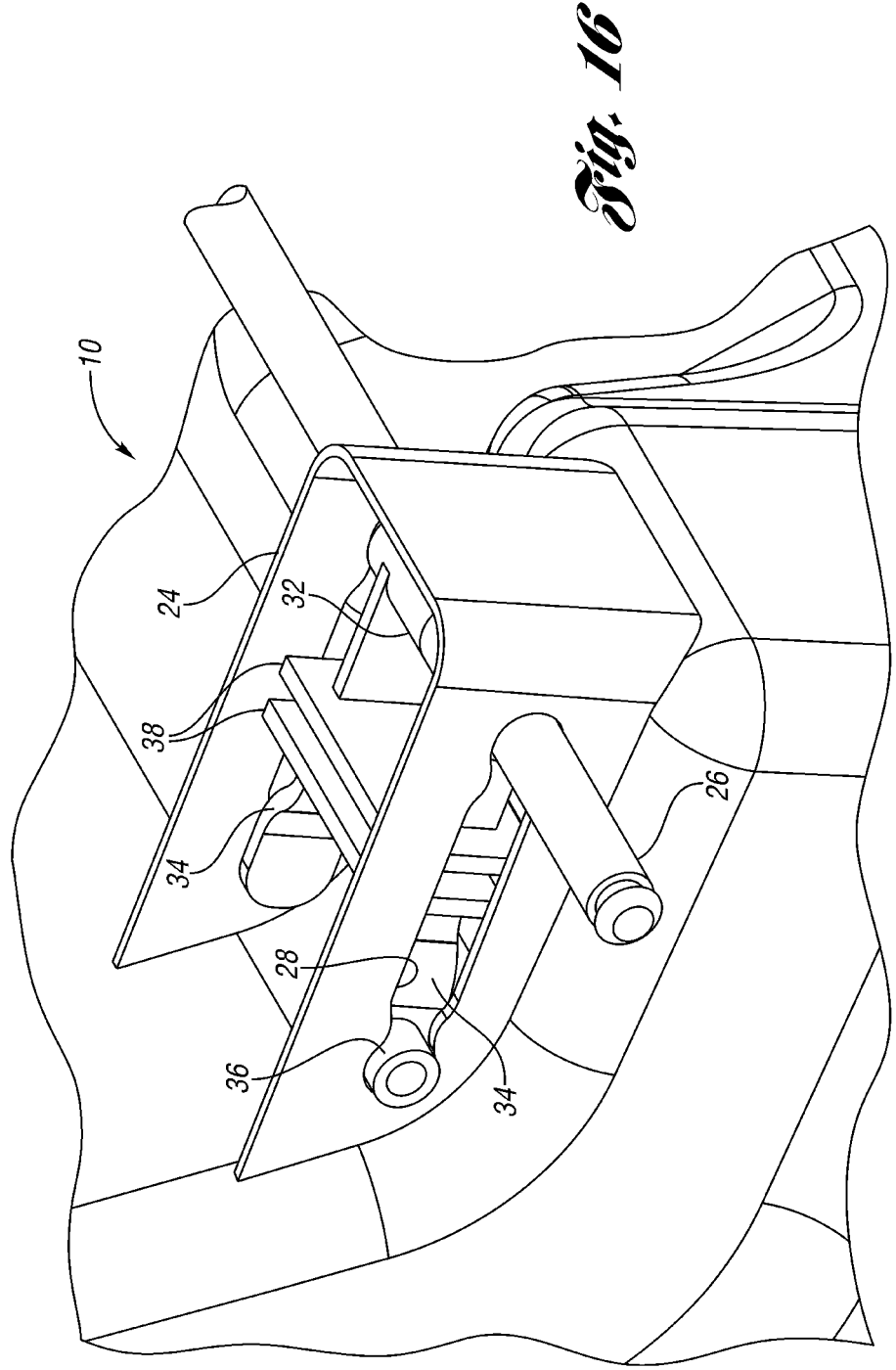
FIG. 16 is a bottom, exterior perspective view of the bracket portion of FIG. 14, with the wheel removed
Figure 17:
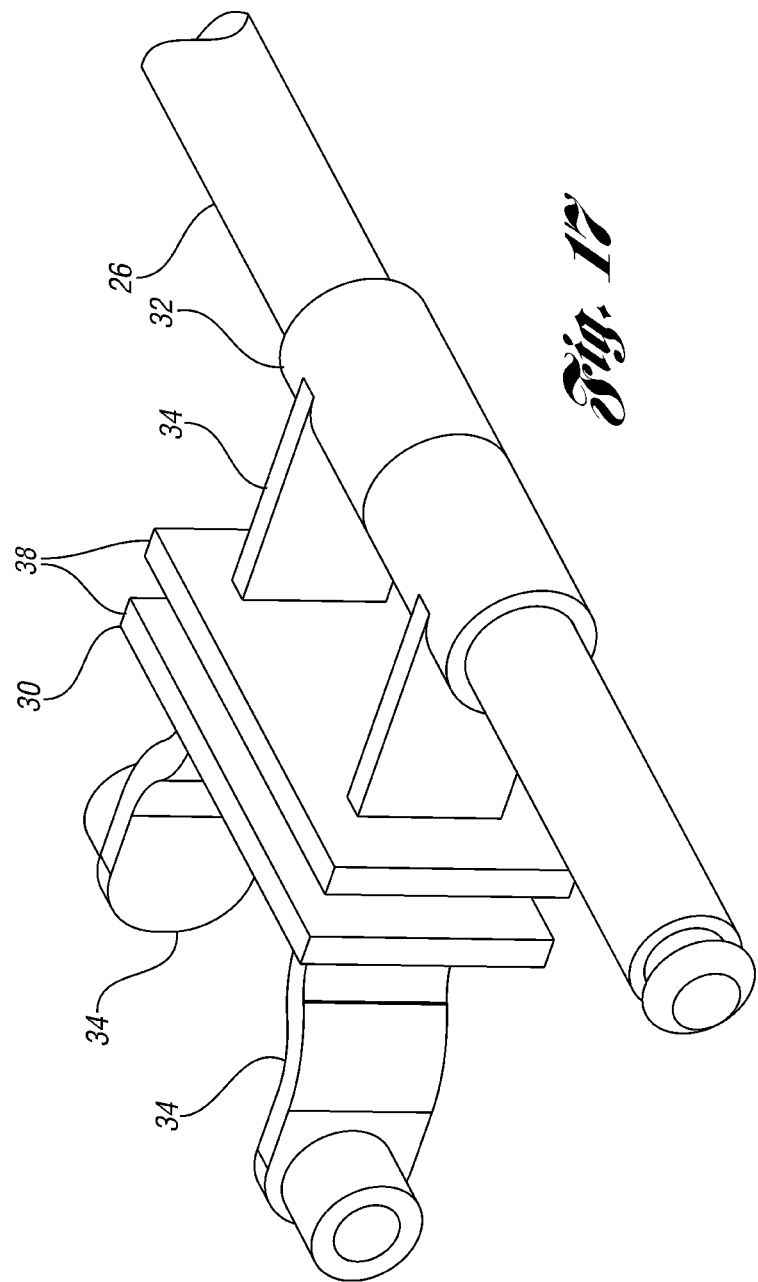
FIG. 17 is a perspective view of the spacer lock with the axle received in the axle-retaining portion.

FIG. 16 is a bottom, exterior perspective view of the bracket portion 24 of FIG. 14, with the wheel 16 removed. FIG. 17 is a perspective view of the spacer lock 30 with the axle 26 received in the axle-retaining portion 32.

Figure 18:
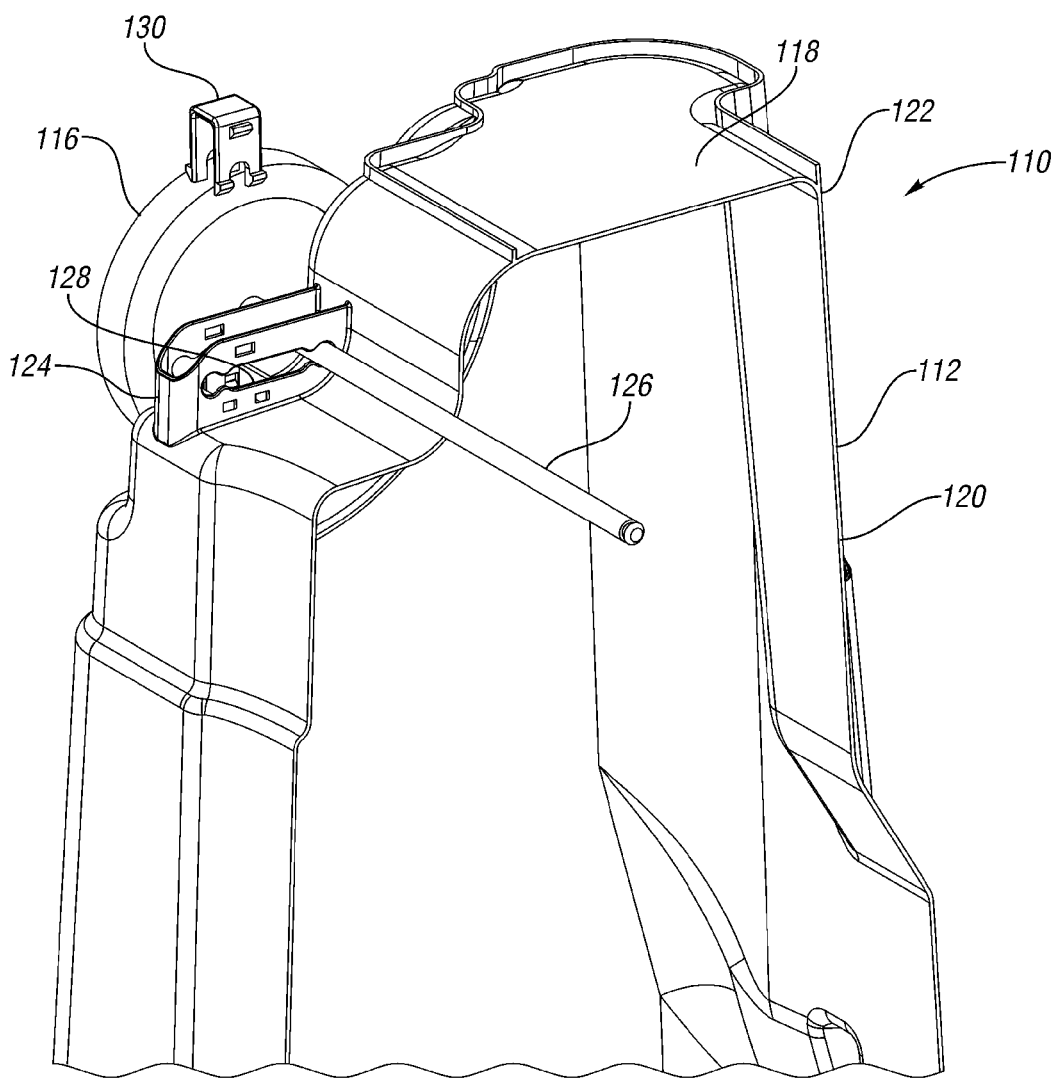
FIG. 18 is a cutaway bottom perspective view of a container according to a second embodiment.

FIGS. 18-22 show a container 110 according to a second embodiment. Referring to FIG. 18, which is a cutaway bottom perspective view of the container 110, the container 110 includes a body 112 and a pair of wheels 116 (one shown) at a lower end of the body 112. The body 112 includes a base wall 118 and a sidewall 120 extending upward from a periphery of the base wall 118. The body 120 includes a forward portion 122 which rests on a ground or floor and a bracket portion 124 to which the wheels 116 are secured by an axle 126. The axle 126 is secured to a pair of the bracket portions 124.

In FIG. 18, the axle 126 and wheel 116 are shown in the retracted, shipping position. The axle 126 is slidable in a slot 128 in each bracket portion 124. In the retracted, storage position, the axle 126 is positioned toward the front of the slot 128, so that the body 112, axle 126 and wheels 116 can be nested within an identical lower body 112. This greatly reduces the amount of space required to ship the bodies 112, or, alternatively eliminates the need to remove (and subsequently reassemble) the wheels 116 and axle 126 to ship the bodies 112.

Figure 19:
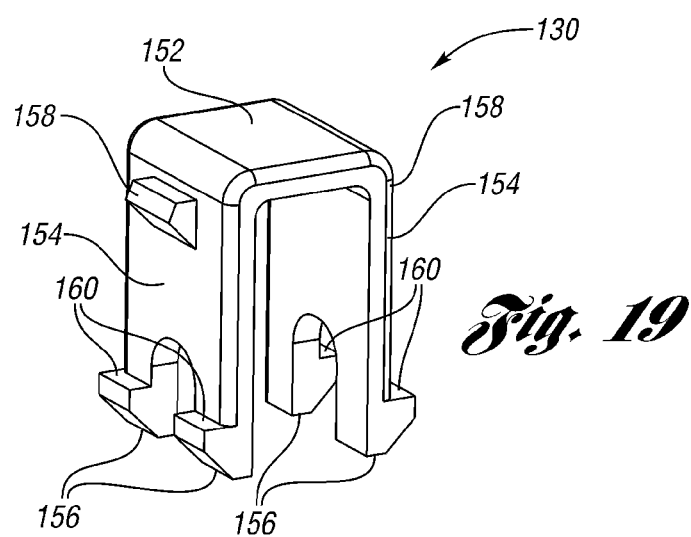
FIG. 19 is a perspective view of the spacer lock of FIG. 18.

FIG. 19 shows the spacer lock 130. The spacer lock 130 (or "clip") includes a body portion 152 having a pair of spaced apart leg walls 154 extending downward therefrom. Each leg wall 154 includes a pair of spaced apart feet 156 extending downward therefrom. Snap tabs 158 extend from each leg wall 154 and snap tabs 160 extend from each foot 156.

Figure 20:
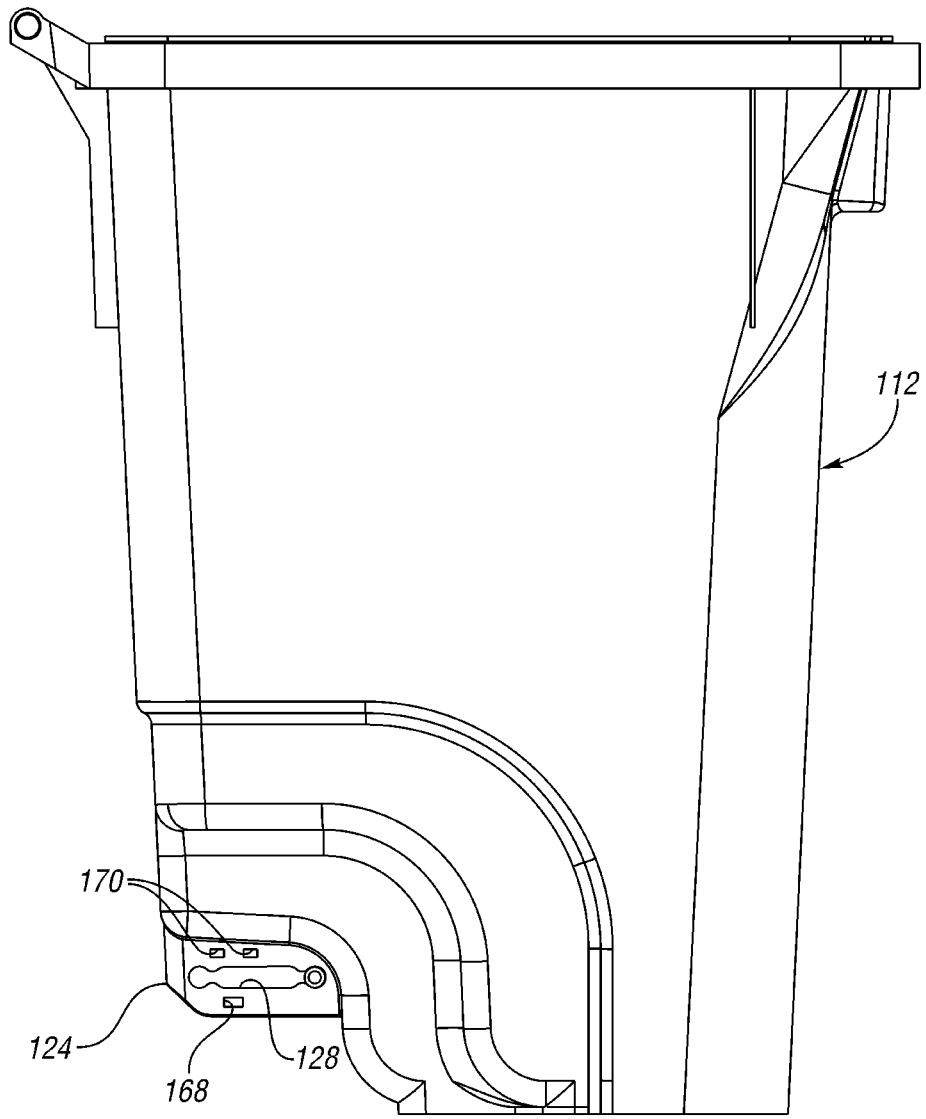
FIG. 20 is a side view of the body of the container of FIG. 18.

FIG. 20 is a side view of the body 112. The bracket portions 124 each include the elongated slot 128 and a plurality of apertures 168, 170 for receiving the snap tabs 158, 160, respectively, of the spacer lock 130.

Figure 21:
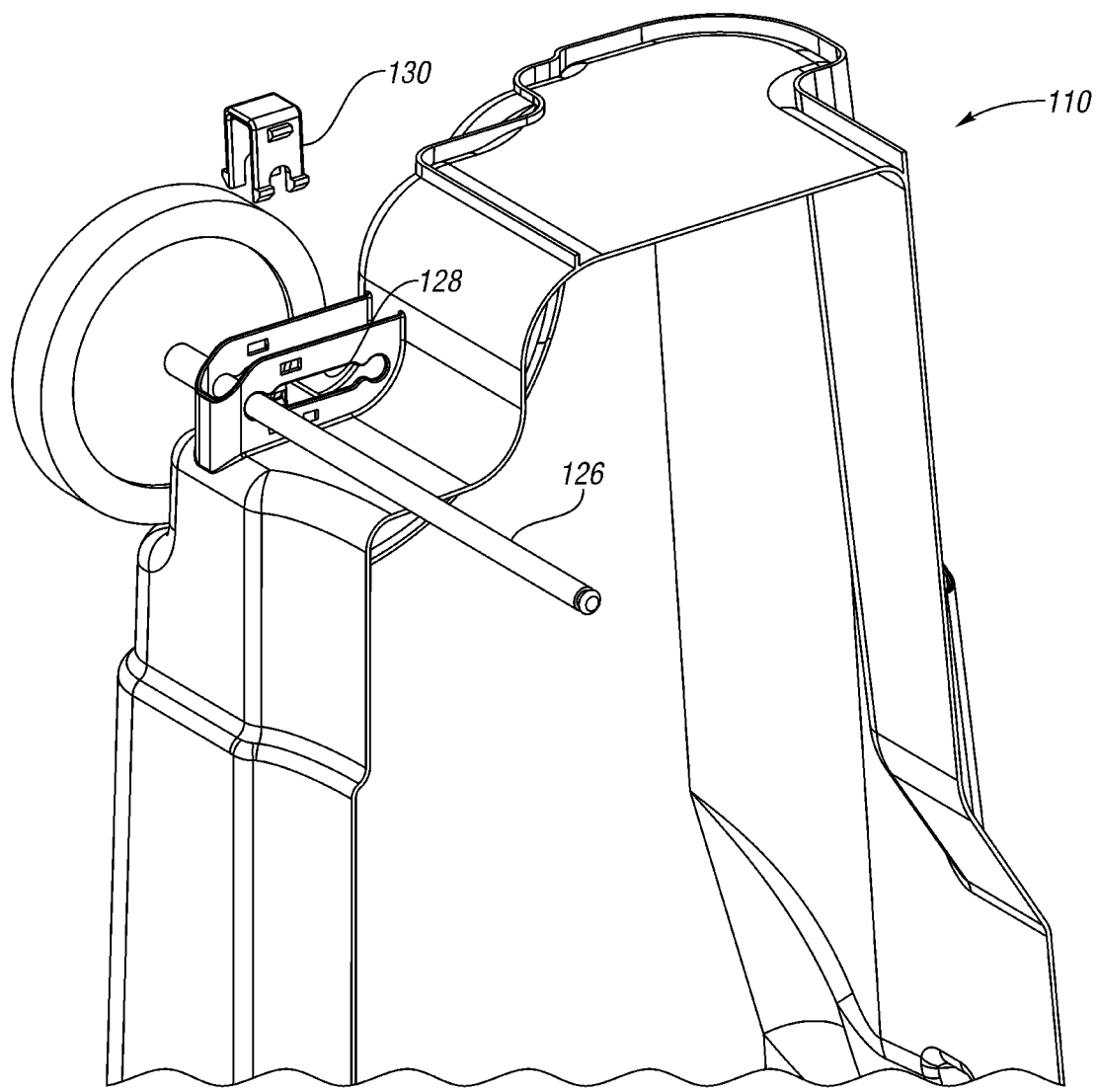
FIG. 21 shows the container of FIG. 18 with the axle slid to the deployed position.
Figure 22:
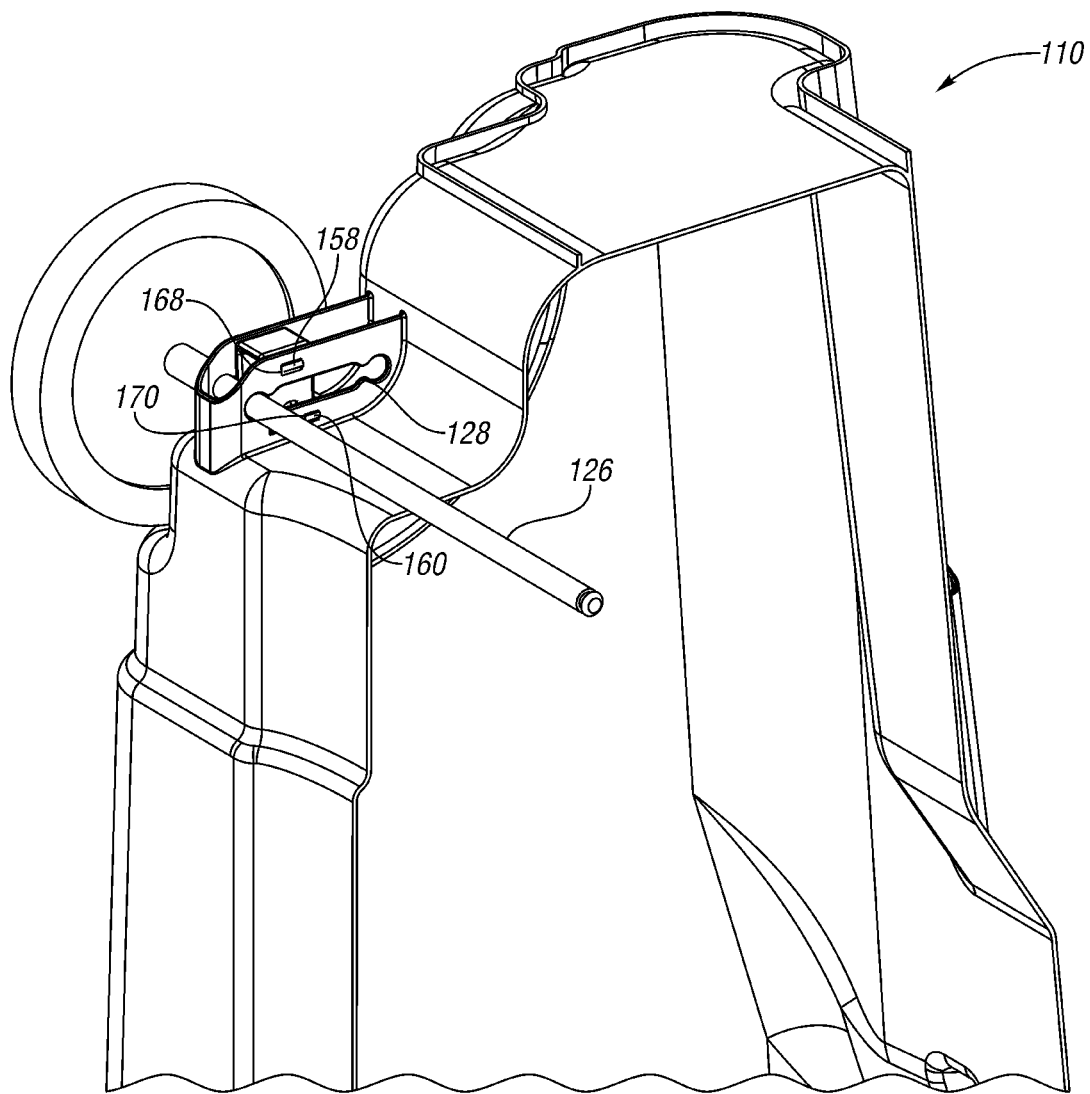
FIG. 22 shows the spacer lock securing the axle in the deployed position.

After the container 110 is shipped and when the container 110 is ready to be deployed, the container 110 is separated from any nested containers 110. The axle 126 is slid to a rearward position in the slot 128 as shown in FIG. 21. The spacer lock 130 is then snap fit into the bracket portions 124 as shown in FIG. 22, forward of the axle 126, with the plurality of apertures 168, 170 receiving the snap tabs 158, 160, respectively. The spacer lock 130 retains the axle 126 in the rearward, deployed, use position as shown in FIG. 22. The container 110 would not be able to nest within an identical body 112.

Figure 23:
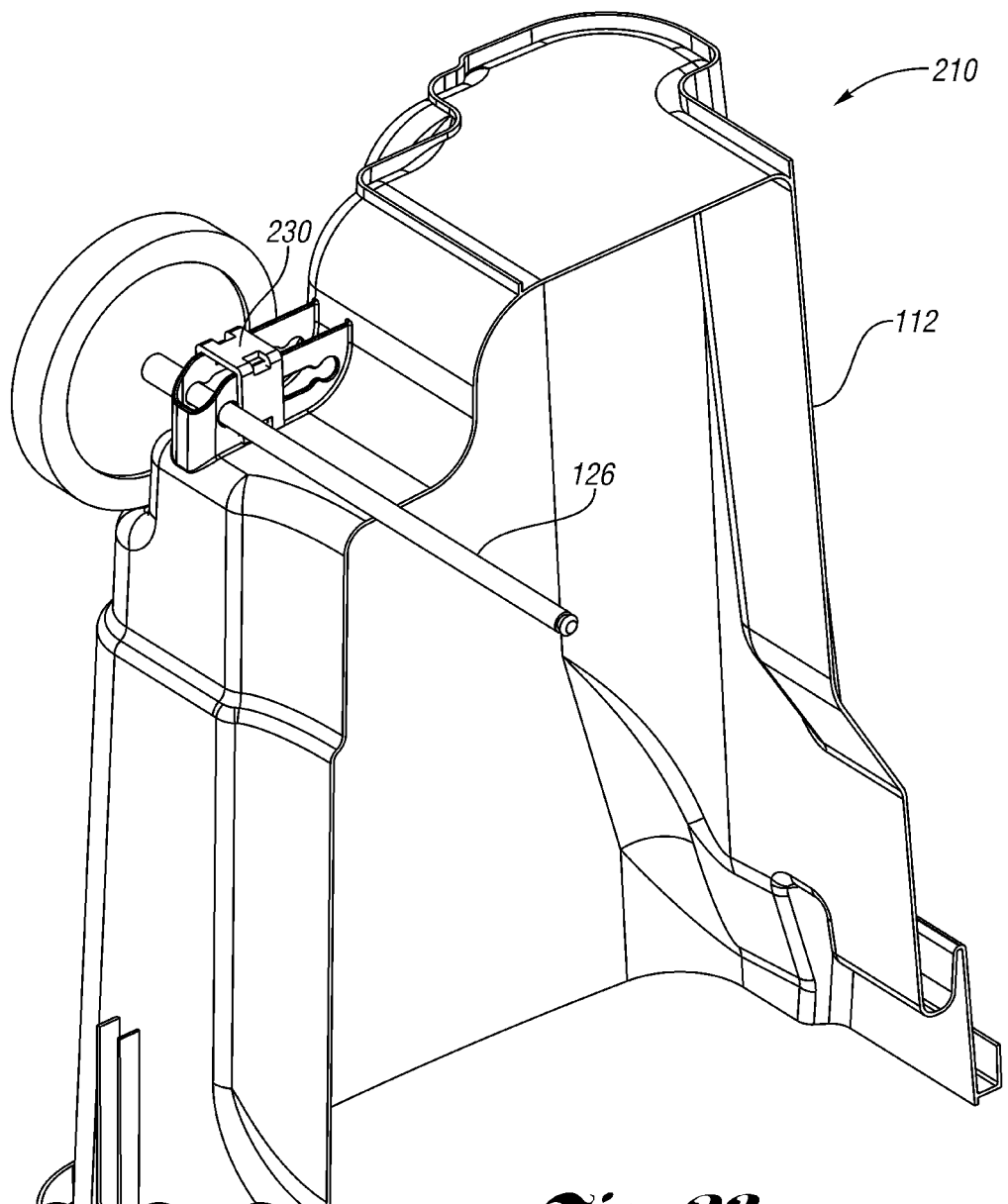
FIG. 23 illustrates an alternate spacer lock for use on the same body as in the previous embodiment.

FIG. 23 illustrates an alternate clip or spacer lock 230 in a container 210, for use on the same body 112 as in the previous embodiment. The alternate spacer lock 230 has leg walls 254 that extend on the exterior of the bracket portions 224, with interior snap-tabs (not visible) received in the same apertures 168, 170 (FIG. 20).

Figure 24:
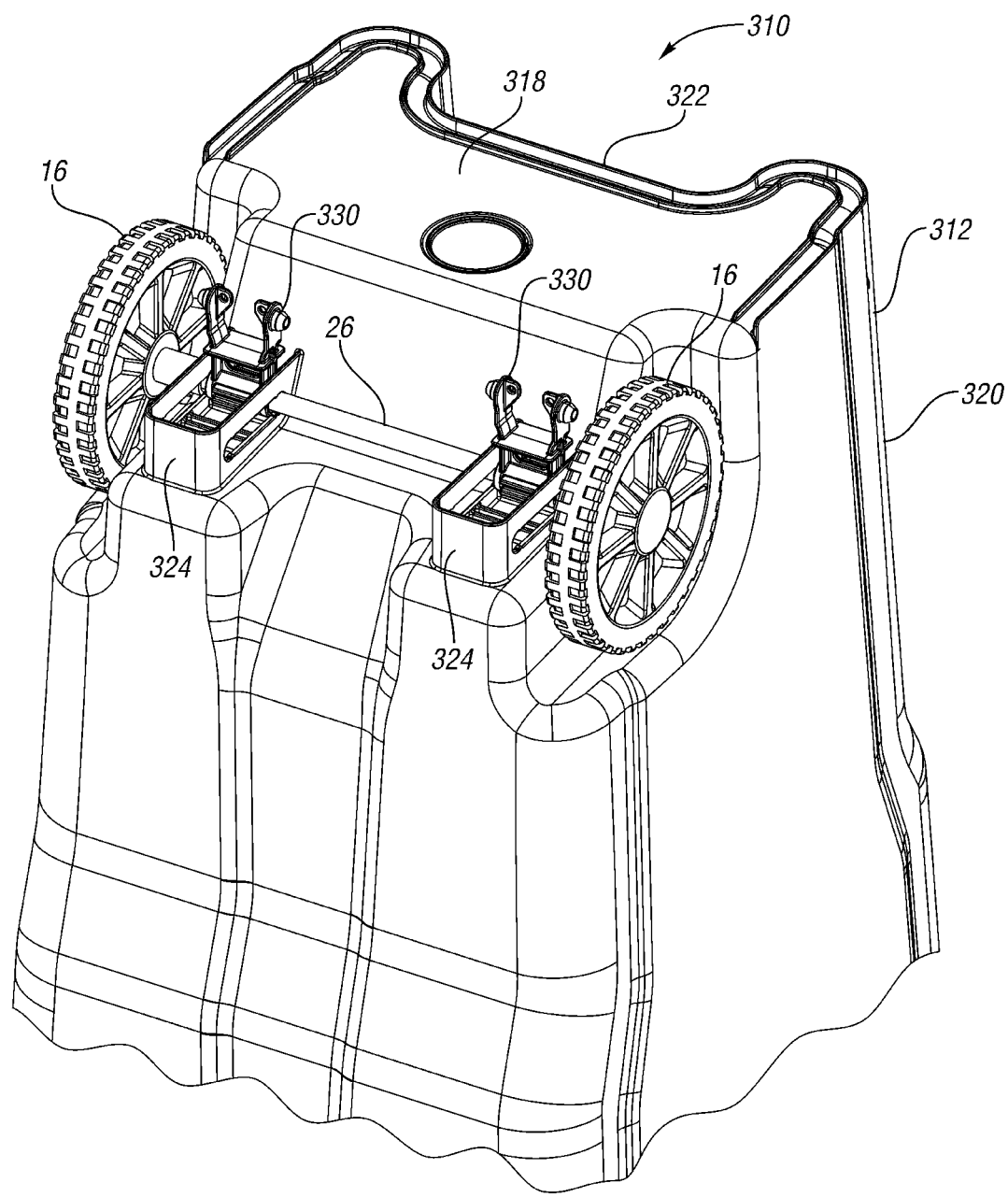
FIG. 24 is a bottom perspective view of a container according to another embodiment with the axle in the retracted position.

FIGS. 24-37 show a container 310 according to another embodiment. Referring to FIG. 24, the container 310 includes a body 312. The container 310 further includes a pair of wheels 16 at a lower end of the body 312. The body 312 includes a base wall 318 and a sidewall 320 extending upward from a periphery of the base wall 318. The body 312 includes a forward portion 322 which rests on a ground or floor and a bracket portion 324 to which the wheels 16 are secured by an axle 26. The axle 26 is secured to a pair of the bracket portions 324. In FIG. 24, the axle 26 is shown slid to the retracted, shipping position, but the spacer locks 330 (or clips) have been released and flipped to their unlocked position.

Figure 25:
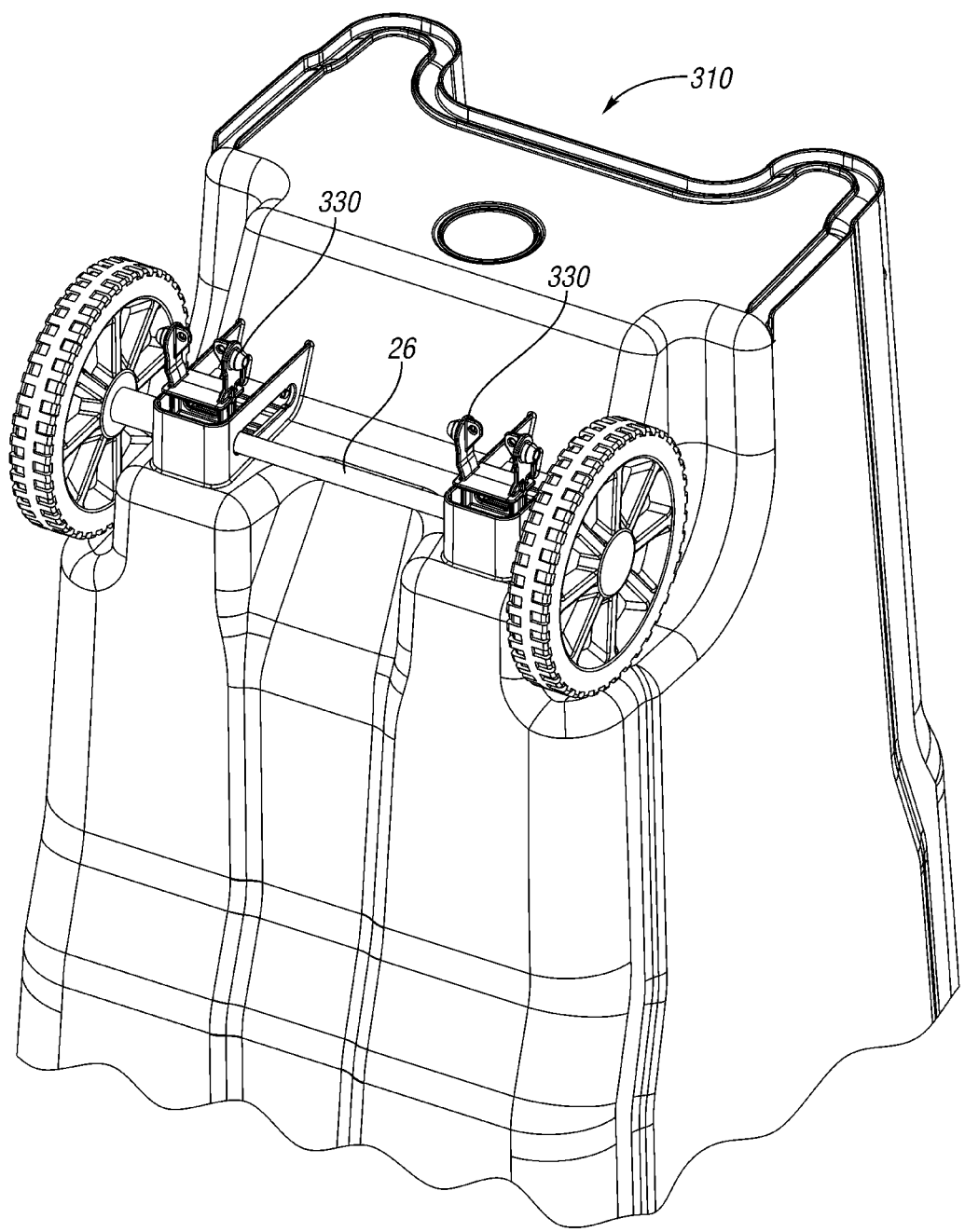
FIG. 25 shows the container of FIG. 24 with the axle in the deployed position.

In FIG. 25, the axle 26 has been slid rearward to the deployed, use position. The spacer locks 330 are still in the unlocked position.

Figure 26:
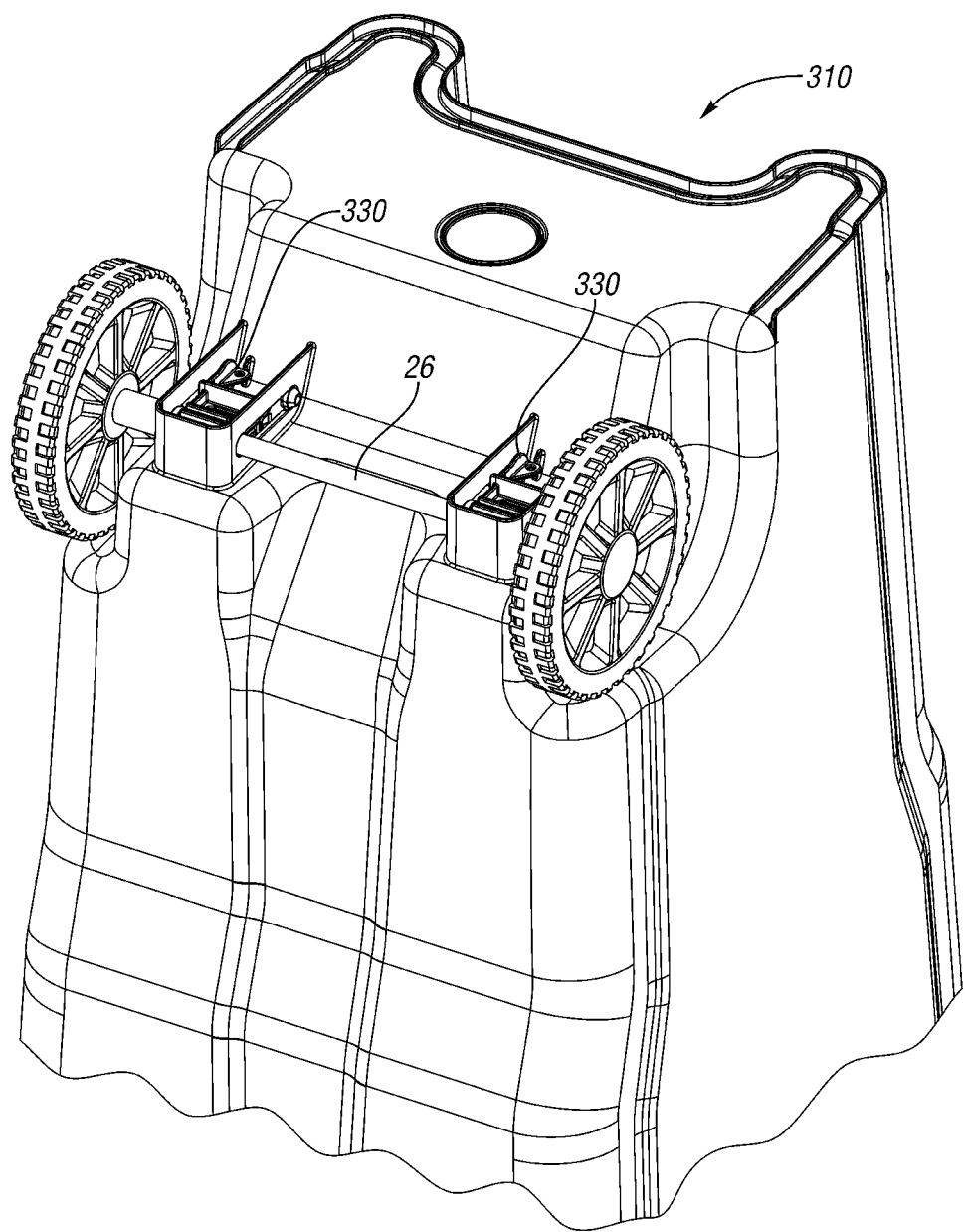
FIG. 26 shows the container of FIG. 25 with the spacer lock locked to retain the axle in the deployed position.

In FIG. 26, the axle 26 is locked in the deployed, use position. The spacer locks 330 are in the locked position in the brackets 324.

Figure 27:
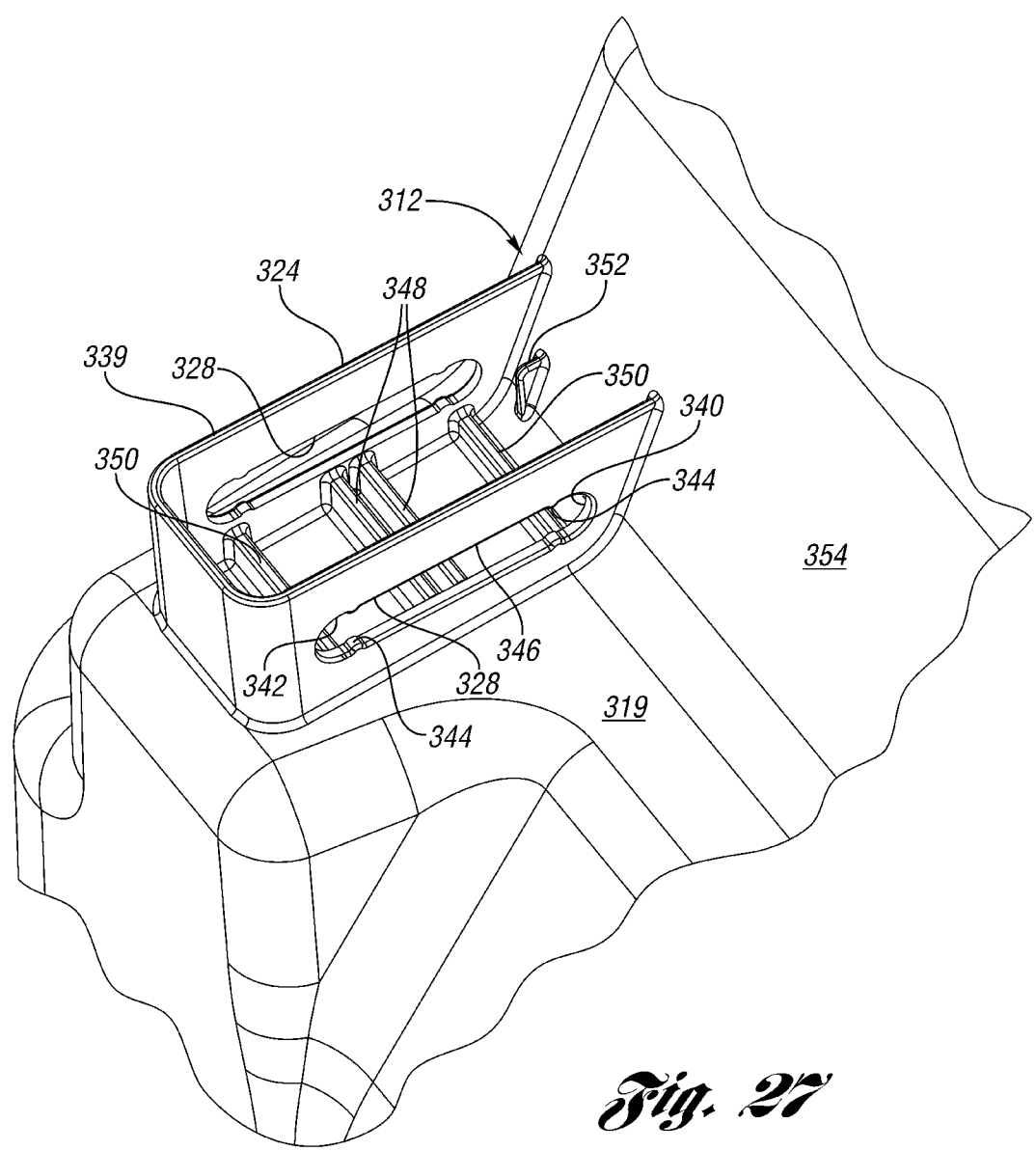
FIG. 27 is a bottom perspective view of one of the brackets of the container of FIG. 24.

FIG. 27 is a bottom perspective view of one of the brackets 324. The bracket portion 324 extends downward from the upper wall portion 319. Each bracket portion 324 includes a pair of spaced apart walls 339, each having an elongated slot 328 formed therein. Each slot 328 includes a forward portion 340 and a rearward portion 342. Reduced width portions 344 are adjacent the forward portion 340 and rearward portion 342. Each slot 328 includes a larger width mid-portion 346 between the reduced width portions 344.

A pair of alignment ribs 348 extend from the upper wall portion 319 between the walls 339 of the bracket portion 324. A support rib 350 extends from the upper wall portion 319 between the walls 339 generally aligned with the forward portion 340 and rearward portion 342 of the slot 328. A locking rib 352 (or a pair of locking ribs 352) projects rearward from an angled wall portion 354 of the base 318 aligned generally with the elongated slot 328.

FIG. 28 is a perspective view of the spacer lock 330. The spacer lock 330 includes an axle-retaining portion 332 having a cylindrical passageway therethrough. A pair of arms 334 extend from the axle-retaining portion 332. Tapered locking pins 336 extend outwardly from ends of the arms 334. A locking plate 338 (or rib) connects mid-portions of the arms 334. Tabs 358 protrude inward toward one another from each of the arms 334 opposite the locking pins 336. As shown in FIG. 29, pair of longitudinal ribs 360 project outward from the axle-retaining portion 332. FIG. 30 is a top view of the spacer lock 330. FIG. 31 is an end view of the spacer lock 330.

Figure 32:
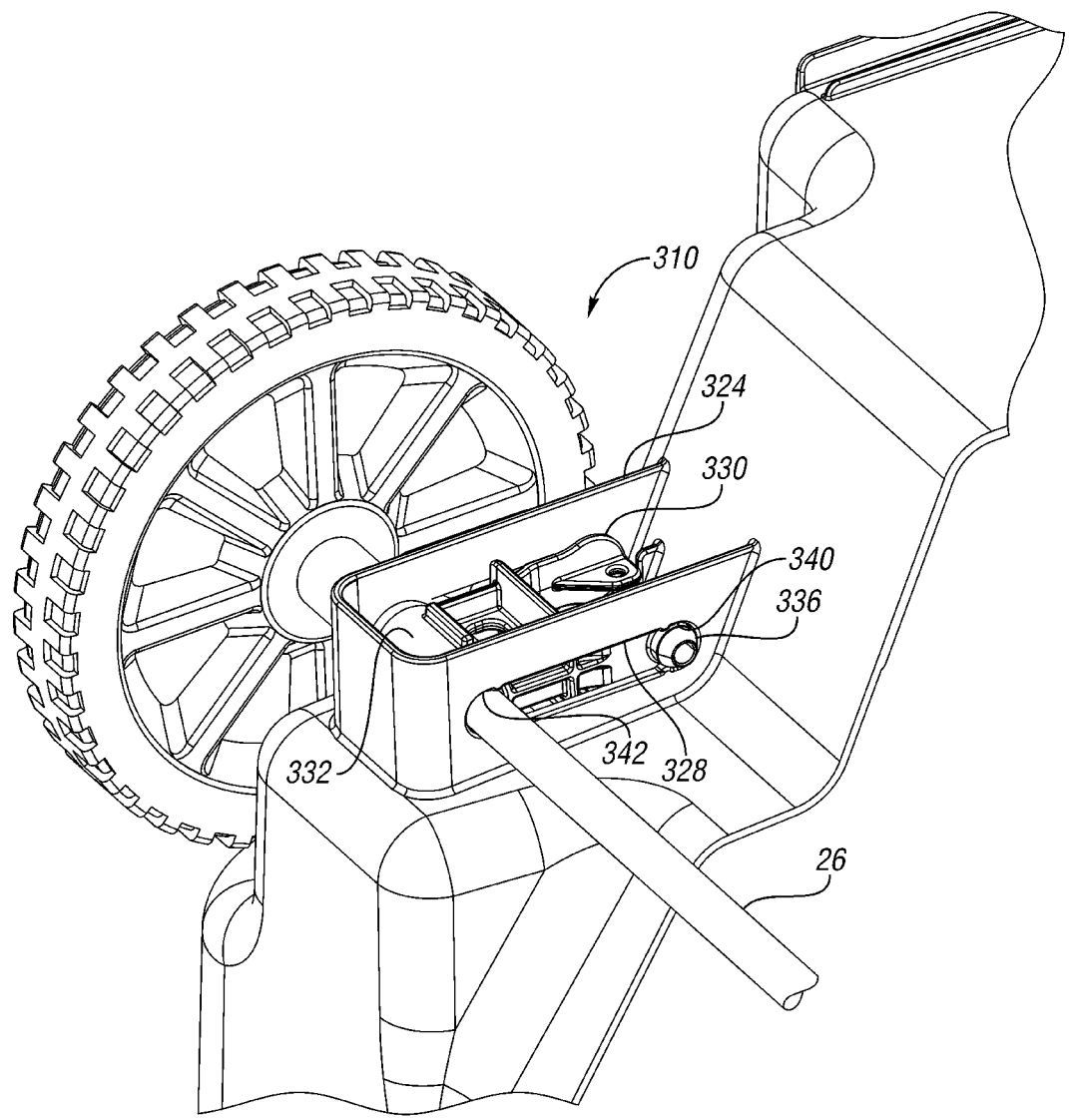
FIG. 32 shows the axle in the deployed, use position in the rearward portion of the elongated slot of the container of FIG. 24.

FIG. 32 shows the axle 26 in the deployed, use position in the rearward portion 342 of the elongated slot 328. The spacer lock 330 is in the locked position with the tapered locking pins 336 snapped into the forward portions 340 of the elongated slot.

Figure 33:
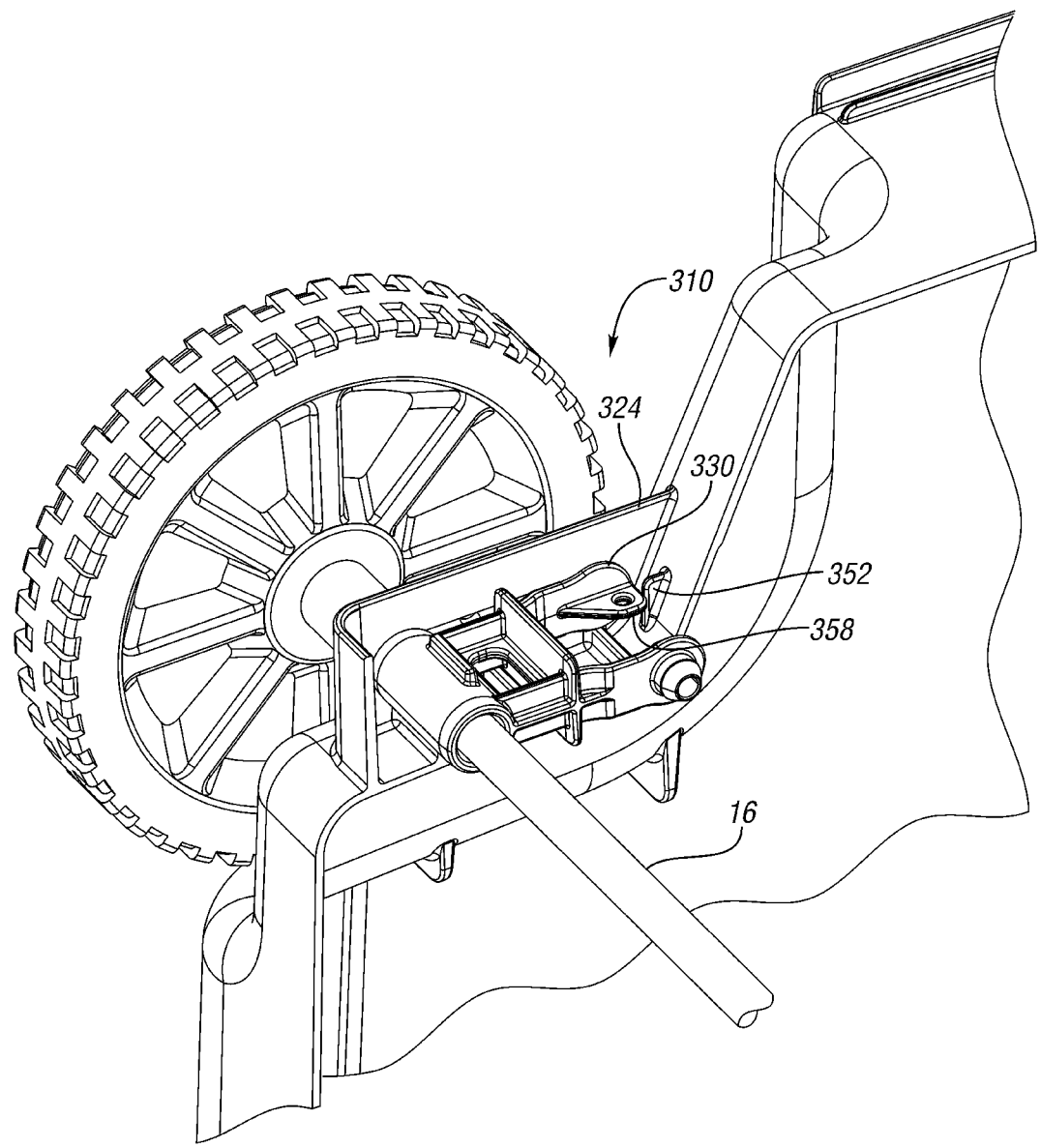
FIG. 33 shows the container of FIG. 32, with half the bracket portion broken away.

FIG. 33 shows the axle area of FIG. 32 with one side of the bracket 324 broken away. The tabs 358 of the spacer lock 330 engage the locking ribs 352 on the container body 312 to assist in holding the spacer lock 330 in the locked position.

Figure 34:
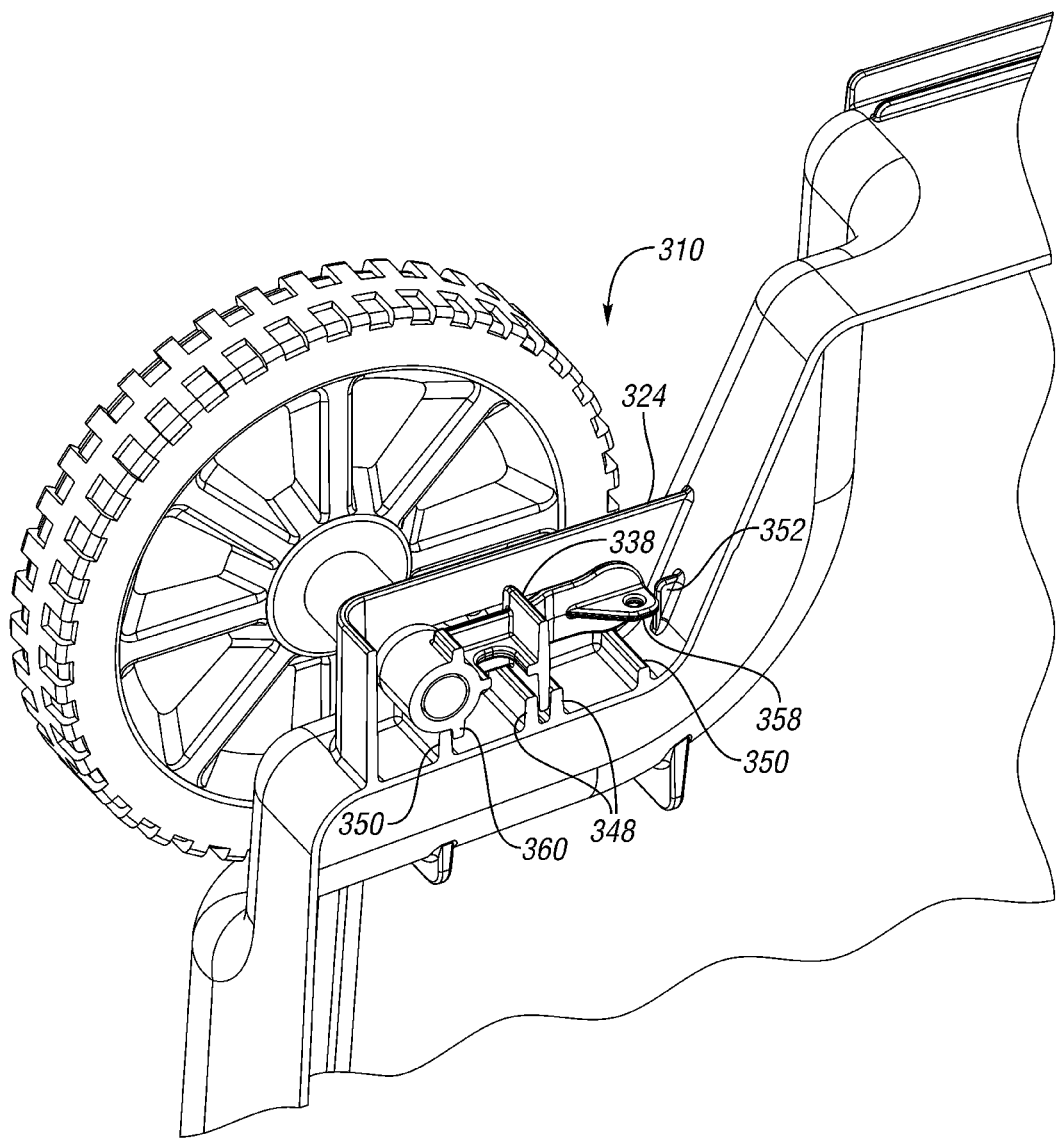
FIG. 34 shows the container of FIG. 33 with half the spacer lock broken away.
Figure 35:
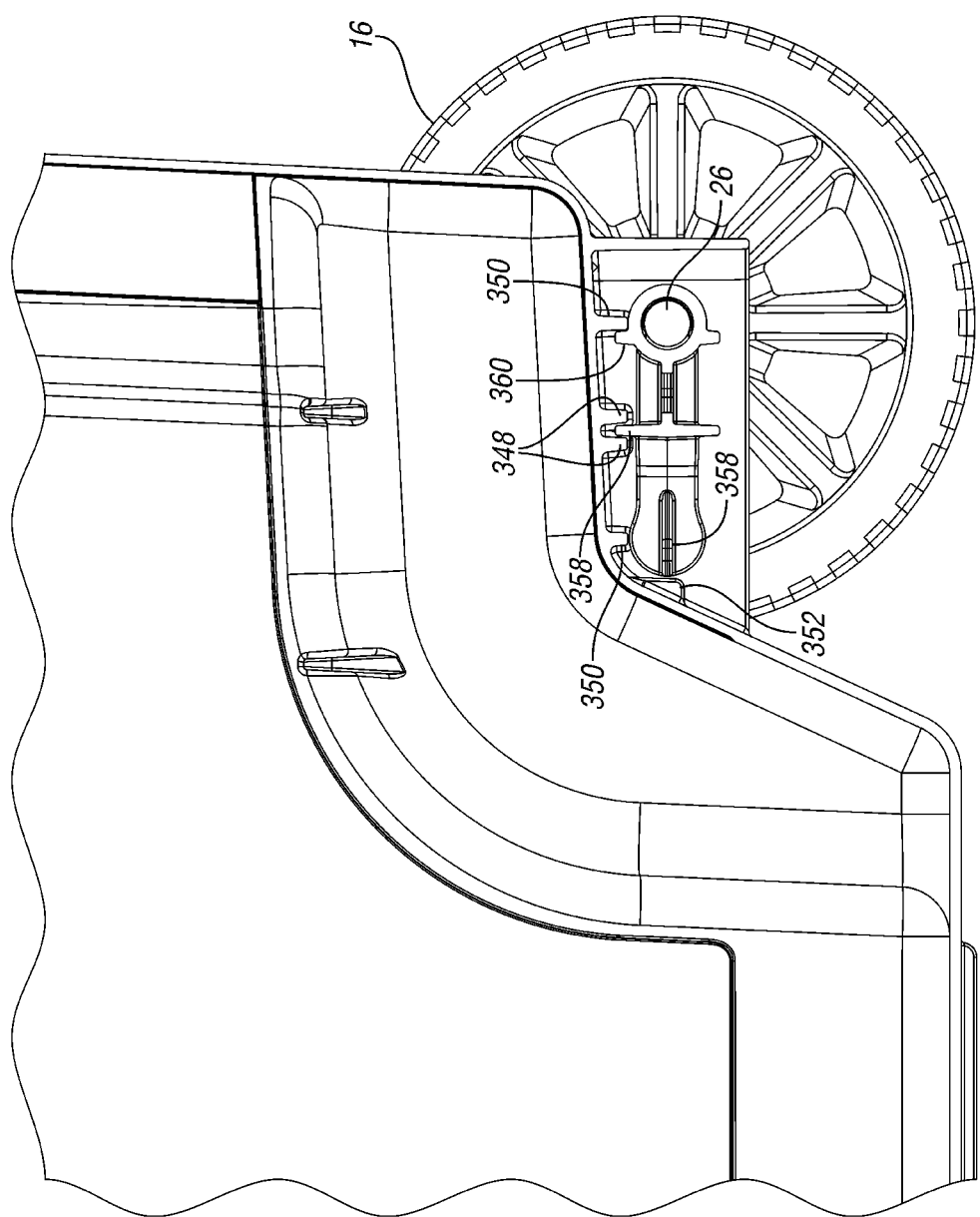
FIG. 35 is a side view of the portion of the container of FIG. 34.

In FIG. 34, half of the spacer lock 330 has been broken away for illustration. The locking plate 338 of the spacer lock 330 is received between the alignment ribs 348 on the upper wall portion 319 of the base 318 of the container body 312. One of the longitudinal ribs 360 engages the rear support rib 350 (the other longitudinal rib 360 engages the front support rib 350 when the spacer lock 330 is in the retracted position). These engagements, together with the tabs 358 engaging the locking ribs 352 and the tapered locking pins 336 in the slot 328, hold the spacer lock 330 in the selected position (deployed as shown in FIG. 34, or retracted). The broken away spacer lock 330 is also shown in FIG. 35.

Figure 36:
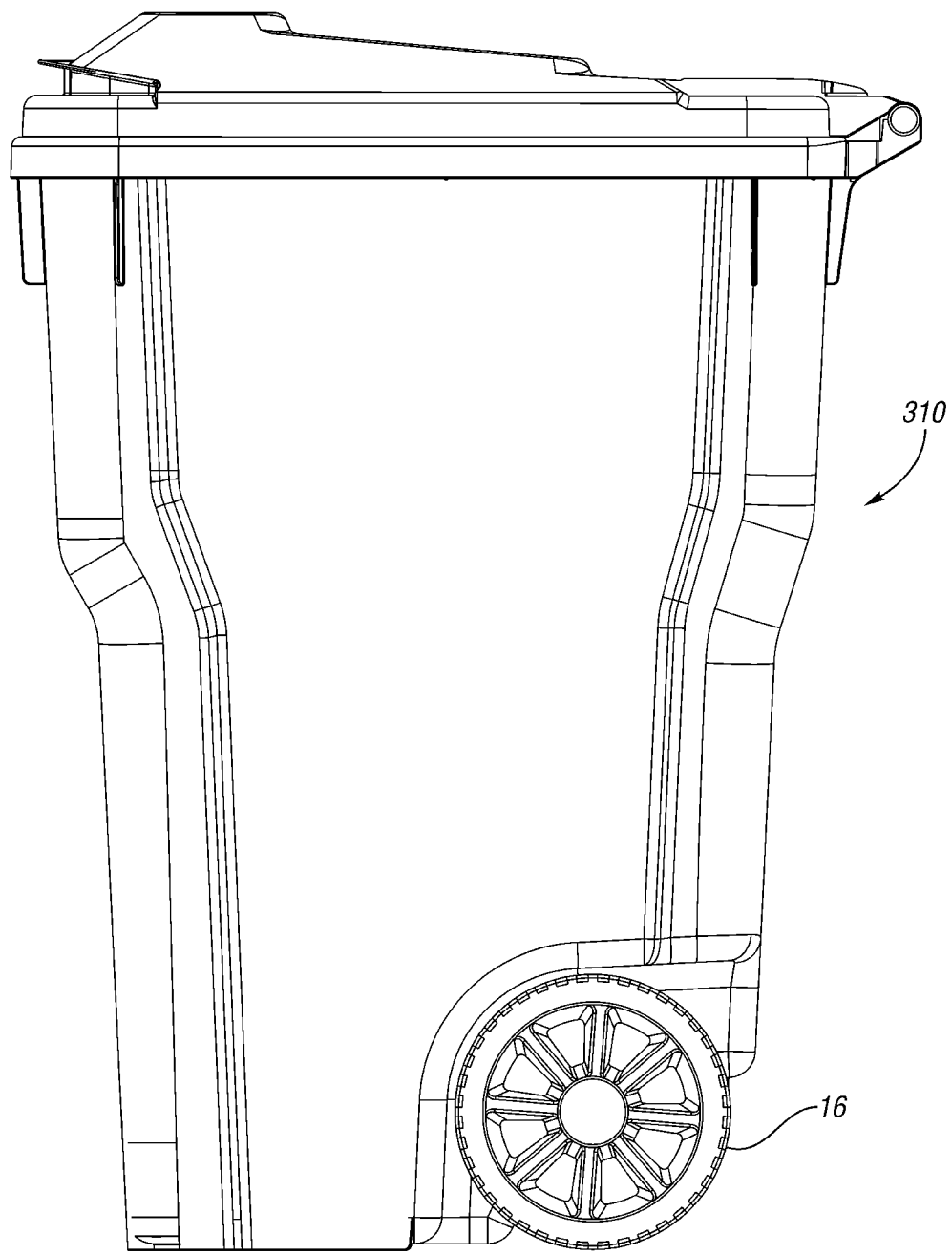
FIG. 36 is a side view of the container of FIG. 24 with the wheels in the retracted, storage position.
Figure 37:
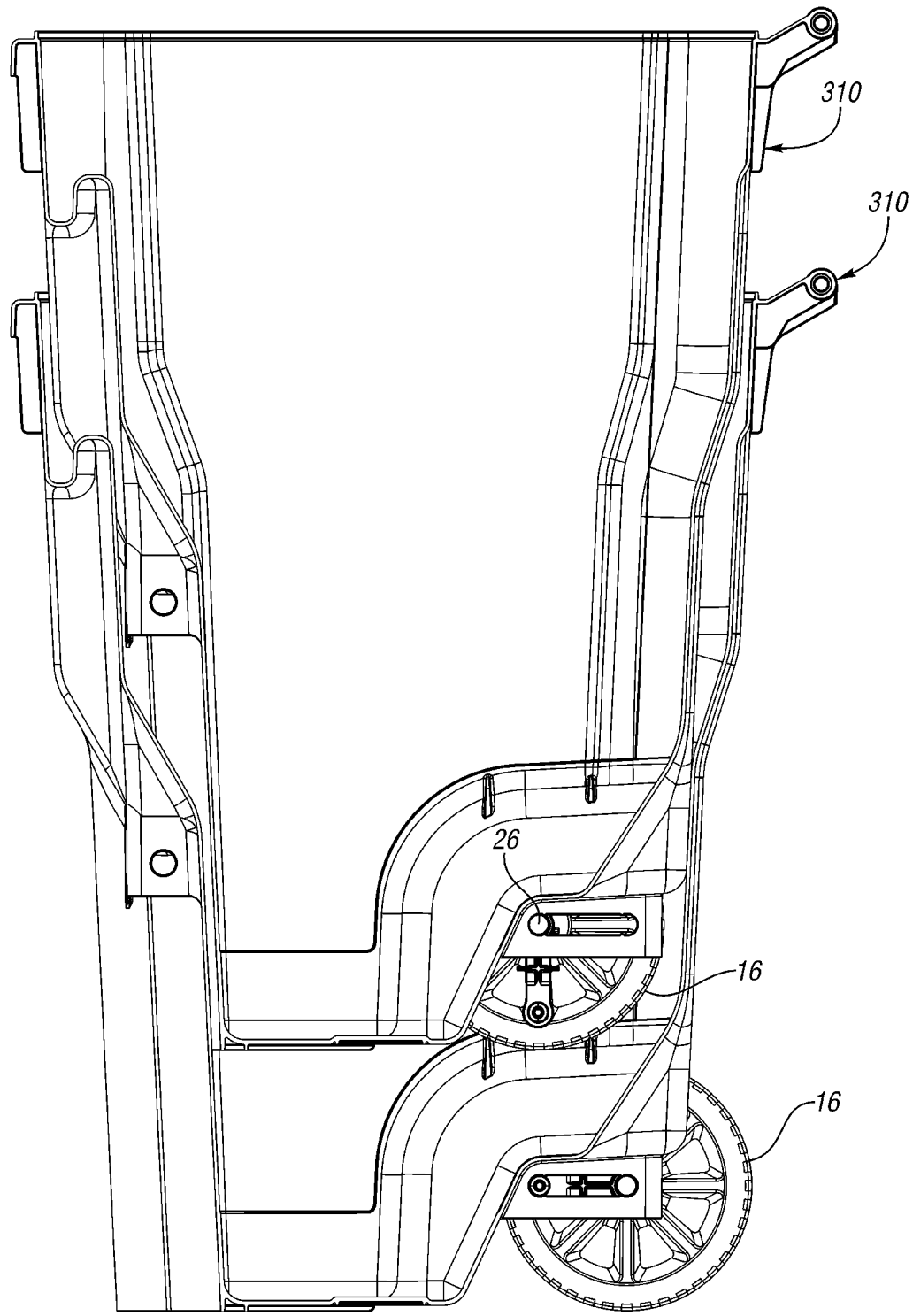
FIG. 37 is a side view of the container of FIG. 24 with the wheels in the deployed, use position.

For shipping or storage, referring to FIG. 36, the wheels 16 can be slid to the forward, retracted position. In this position, the container 310 can be nested inside an identical container 310 as shown in FIG. 37. When ready for use (or for sale), the wheels 16 can be slid to and locked in the deployed, use position, as described above.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A container comprising:
a body having base wall and a side wall extending upward from the base wall, the side wall tapered down to the base such that an identical body could be nested within the body, the body including a bracket portion having an elongated slot;
an axle extending through the elongated slot, the axle slidable in the elongated slot between a deployed position and a retracted position;
a wheel connected proximate one end of the axle; and
a clip securing the axle within the elongated slot.

2. The container of claim 1 wherein the wheel is a first wheel, further including a second wheel connected proximate an opposite end of the axle.

3. The container of claim 1 wherein the clip is configured to secure the axle in both the deployed position and in the retracted position.

4. The container of claim 1 wherein the clip is completely removable from the container.

5. The container of claim 1 wherein the axle extends through the clip.

6. The container of claim 5 wherein the clip is configured to secure the axle in the deployed position and wherein the clip is configured to secure the axle in the retracted position.

7. The container of claim 6 wherein the clip is rotated about the axle between the deployed position and the retracted position.

8. The container of claim 1 wherein the clip includes an axle-retaining portion having a passageway therethrough, the clip further including locking pins spaced away from the axle-retaining portion, such that the locking pins are received in the elongated slot.

9. The container of claim 8 wherein the axle is in a rearward end of the elongated slot when the axle is in the deployed position and wherein the axle is in a forward end of the elongated slot when the axle is in the retracted position.

10. The container of claim 9 wherein the locking pins are in the forward end of the elongated slot when the axle is in the deployed position and wherein the locking pins are in the rearward end of the elongated slot when the axle is in the retracted position.

11. The container of claim 10 wherein the wheel is a first wheel, further including a second wheel connected proximate an opposite end of the axle.

12. The container of claim 8 wherein the clip includes a pair of arms extending from the axle-retaining portion to locking pins extending outward from the pair of arms.

13. The container of claim 12 wherein the clip includes at least one locking rib.

14. The container of claim 1 wherein a rib on the clip abuts a rib on the container to retain the axle in the deployed position.

15. A container comprising:
a base wall;
a side wall extending upward from the base wall, the side wall tapered down to the base wall such that an identical container could be nested within the container;
a bracket portion extending downward from the base wall, the bracket portion including a pair of spaced apart walls each having an elongated slot; and
an alignment rib extending downward from the base wall between the pair of spaced apart walls a clip securing an axle within the elongated slot.

16. The container of claim 15 further including
an axle extending through the elongated slots, the axle slidable in the elongated slots between a forward portion of the elongated slot and a rearward portion of the elongated slot.

17. The container of claim 16 further including a wheel connected proximate each end of the axle.

18. A container comprising:
- a body having base wall and a side wall extending upward from the base wall, the body including a bracket portion having an elongated slot;
- an axle extending through the elongated slot, the axle slidable in the elongated slot between a rearward, deployed position and a forward, retracted position;
- a wheel connected proximate each end of the axle, wherein the wheels protrude rearwardly of the body when the axle is in the deployed position and wherein the wheels do not protrude rearwardly of the body when the axle is in the retracted position; and
- a clip securing the axle within the elongated slot.

19. The container of claim 18 wherein the side wall of the body is tapered down to the base such that an identical container could be nested within the container when the axle is in the retracted position, but could not be nested within the container when the axle is in the deployed position.

\* \* \* \* \*

UNITED STATES PATENT AND TRADEMARK OFFICE
CERTIFICATE OF CORRECTION

PATENT NO. : 8,919,791 B2  
APPLICATION NO. : 13/677366  
DATED : December 30, 2014  
INVENTOR(S) : Derick Foster Page 1 of 1

It is certified that error appears in the above-identified patent and that said Letters Patent is hereby corrected as shown below:

IN THE CLAIMS:

In claim 15, column 6, line 59; immediately after "walls" insert --;--

Signed and Sealed this  
Seventh Day of April, 2015

Michelle K. Lee  
*Director of the United States Patent and Trademark Office*